US012598291B2

(12) United States Patent
Kim et al.

(10) Patent No.: US 12,598,291 B2
(45) Date of Patent: Apr. 7, 2026

(54) VIDEO SIGNAL PROCESSING METHOD USING OUT-OF-BOUNDARY BLOCK AND APPARATUS THEREFOR

(71) Applicant: WILUS INSTITUTE OF STANDARDS AND TECHNOLOGY INC., Gyeonggi-do (KR)

(72) Inventors: Kyungyong Kim, Gyeonggi-do (KR); Dongcheol Kim, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/730,749

(22) PCT Filed: Jan. 19, 2023

(86) PCT No.: PCT/KR2023/000914
§ 371 (c)(1),
(2) Date: Jul. 19, 2024

(87) PCT Pub. No.: WO2023/140635
PCT Pub. Date: Jul. 27, 2023

(65) Prior Publication Data
US 2025/0233978 A1     Jul. 17, 2025

(30) Foreign Application Priority Data

Jan. 21, 2022    (KR) ........................ 10-2022-0009544
Jun. 28, 2022    (KR) ........................ 10-2022-0078993

(51) Int. Cl.
H04N 19/52        (2014.01)
H04N 19/105       (2014.01)
(Continued)

(52) U.S. Cl.
CPC ......... H04N 19/105 (2014.11); H04N 19/139 (2014.11); H04N 19/167 (2014.11);
(Continued)

(58) Field of Classification Search
CPC ...... H04N 19/82; H04N 19/573; H04N 19/52; H04N 19/159
See application file for complete search history.

(56) References Cited

U.S. PATENT DOCUMENTS 8,085,846 B2 *  12/2011  Tourapis .............. H04N 19/109
                                               348/620
11,792,426 B2 *  10/2023  Moon .................. H04N 19/105
                                               375/240.12
(Continued)

FOREIGN PATENT DOCUMENTS

KR    10-2021-0059709        5/2021
KR    10-2021-0158396        12/2021
(Continued)

OTHER PUBLICATIONS

Enhanced bi-directional motion compensation; Chen—Jan. 2022; (Year: 2022).*

(Continued)

*Primary Examiner* — Luis Perez-Fuentes
(74) *Attorney, Agent, or Firm* — WOMBLE BOND DICKINSON (US) LLP

(57)            ABSTRACT

A video signal decoding device is disclosed. The video signal decoding device comprises a processor, and the processor obtains motion information from neighboring blocks of a current block and corrects the motion information to obtain motion information of the current block.

13 Claims, 21 Drawing Sheets

(51) Int. Cl.

| | |
|---|---|
| *H04N 19/139* | (2014.01) |
| *H04N 19/159* | (2014.01) |
| *H04N 19/167* | (2014.01) |
| *H04N 19/172* | (2014.01) |
| *H04N 19/176* | (2014.01) |
| *H04N 19/573* | (2014.01) |
| *H04N 19/82* | (2014.01) |

(52) U.S. Cl.
CPC ......... *H04N 19/172* (2014.11); *H04N 19/176* (2014.11); *H04N 19/52* (2014.11); *H04N 19/573* (2014.11); *H04N 19/82* (2014.11)

(56) References Cited

U.S. PATENT DOCUMENTS

| | | | | |
|---|---|---|---|---|
| 11,968,407 | B2 * | 4/2024 | Wang | H04N 19/96 |
| 12,212,745 | B2 * | 1/2025 | Bordes | H04N 19/117 |
| 12,238,279 | B2 * | 2/2025 | Chen | H04N 19/513 |
| 12,309,423 | B2 * | 5/2025 | Moon | H04N 19/159 |
| 12,323,615 | B2 * | 6/2025 | Chen | H04N 19/172 |
| 12,335,541 | B2 * | 6/2025 | Wang | H04N 19/70 |
| 2023/0247216 | A1 | 8/2023 | Huang et al. | |
| 2023/0328257 | A1 | 10/2023 | Zhang et al. | |

FOREIGN PATENT DOCUMENTS

| | | |
|---|---|---|
| WO | 2021/068922 | 4/2021 |
| WO | 2021/172881 | 9/2021 |
| WO | 2023/076700 | 5/2023 |
| WO | 2023/101990 | 6/2023 |
| WO | 2023/141177 | 7/2023 |

OTHER PUBLICATIONS

Design of Efficient Streaming deblocking & Sao filter for HEVC; Baldev; Feb. 2018; (Year: 2018).*

Deblocking for NxN block boundaries not aligned with 8x8 grid; Anderson—Jan. 2019; (Year: 2019).*

International Search Report for PCT/KR2023/000914 mailed on May 8, 2023 and its English translation from WIPO (now published as WO2023/140635).

Written Opinion of the International Searching Authority for PCT/KR2023/000914 mailed on May 8, 2023 and its English translation by Google Translate (now published as WO2023/140635).

Chen, Yi-Wen et al.: "AHG12: Enhanced bi-directional motion compensation", Joint Video Experts Team (JVET) of ITU-T SG 16 WP 3 and ISO/IEC JTC I/SC 29, 25th Meeting, by teleconference, document: JVET-Y0125, Jan. 13, 2022.

Zhang, Zhi et al.: "EE2-related: Motion compensation boundary padding", Joint Video Experts Team (JVET) of ITU-T SG 16 WP 3 and ISO/IEC JTC I/SC 29, 26th Meeting, by teleconference, document: JVET-Z0130-v5, Apr. 20-29, 2022.

Chen, Yi-Wen et al.: "EE2: Enhanced bi-directional motion compensation (test 2.2)", Joint Video Experts Team (JVET) of ITU-T SG 16 WP 3 and ISO/IEC JTC I/SC 29, 26th Meeting, by teleconference, document: JVET-Z0136, Apr. 20-29, 2022.

* cited by examiner (a)

(b)

(c)

| mvd_coding( x0, y0, refList ,cpIdx ) { | Descriptor |
|---|---|
| mvd_zero_flag | ae(v) |
| if( mvd_zero_flag == 0) { | |
| abs_mvd_greater0_flag[ 0 ] | ae(v) |
| if( abs_mvd_greater0_flag[ 0 ] == 1) | |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| mvd_sign_flag[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| mvd_sign_flag[ 1 ] | ae(v) |
| } | |
| } | |
| } | |

FIG. 20

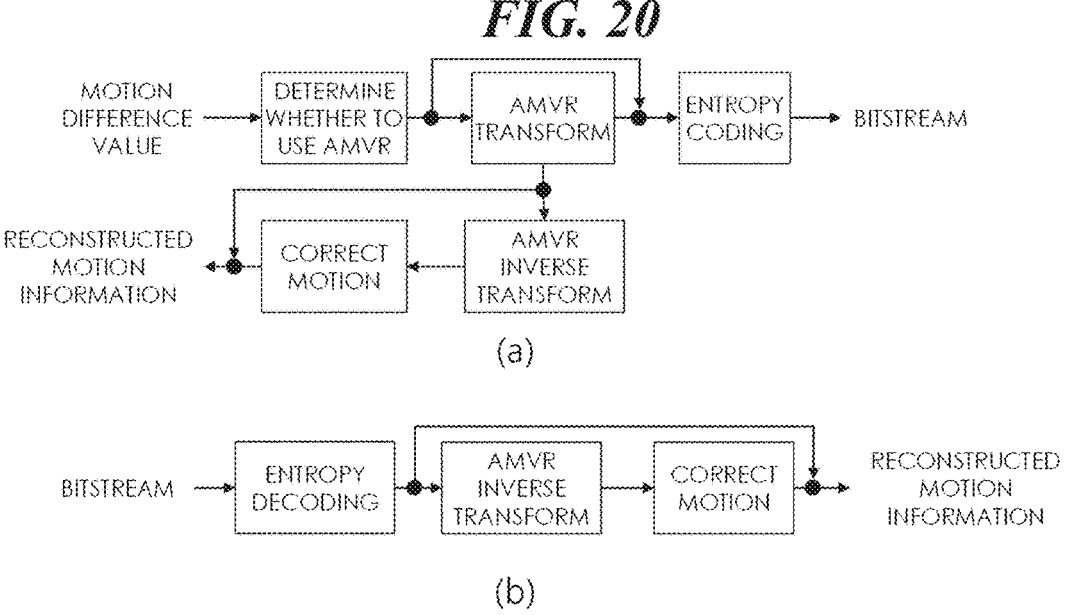

$$\frac{1}{9} \times \begin{bmatrix} 1 & 1 & 1 \\ 1 & 1 & 1 \\ 1 & 1 & 1 \end{bmatrix} \qquad \frac{1}{12} \times \begin{bmatrix} 1 & 1 & 1 \\ 1 & 4 & 1 \\ 1 & 1 & 1 \end{bmatrix} \qquad \frac{1}{18} \times \begin{bmatrix} 1 & 1 & 1 \\ 1 & 10 & 1 \\ 1 & 1 & 1 \end{bmatrix}$$

(a)

(b)

VIDEO SIGNAL PROCESSING METHOD USING OUT-OF-BOUNDARY BLOCK AND APPARATUS THEREFOR

CROSS-REFERENCE TO RELATED APPLICATIONS

This application is the U.S. National Stage of International Patent Application No. PCT/KR2023/000914 filed on Jan. 19, 2013, which claims the priority to Korean Patent Application No. 10-2022-0009544 filed in the Korean Intellectual Property Office on Jan. 21, 2022, and Korean Patent Application No. 10-2022-0078993 filed in the Korean Intellectual Property Office on Jun. 28, 2022, the entire contents of which are incorporated herein by reference.

TECHNICAL FIELD

The present disclosure relates to a video signal processing method and apparatus and, more specifically, to a video signal processing method and device by which a video signal is encoded or decoded.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation.

However, with the recent development of various media and data transmission media, a more efficient video signal processing method and apparatus are required.

DISCLOSURE OF INVENTION

Technical Problem

The purpose of the present disclosure is to provide a video signal processing method and a apparatus therefor, so as to increase the coding efficiency of a video signal.

Solution to Problem

A video signal decoding apparatus according to an embodiment of the present disclosure includes a processor.

The processor is configured to acquire motion information from a neighboring block of a current block, and correct the motion information to acquire motion information of the current block.

The processor may be configured to correct the motion information by using at least one among motion vector difference (MVD), merge mode with MVD (MMVD), template matching (TM), bilateral matching (BM), optical flow-based TM, decoder-side motion vector refinement (DMVR), and multi-pass DMVR.

The processor may be configured to determine whether to correct the motion information based on whether adaptive motion vector resolution (AMVR) is used on the current block.

The processor may be configured to determine whether to correct the motion information based on whether the adaptive motion vector resolution (AMVR) is used on the current block and whether a motion resolution of the AMVR is set to a predetermined resolution.

The processor may be configured to determine whether to perform adaptive motion vector resolution (AMVR) on the current block based on whether the motion correction has been performed on the current block.

The processor may be configured to determine a boundary between a unidirectional prediction area and a bidirectional prediction area and apply a deblocking filter to the determined boundary.

The processor may be configured to determine the boundary between the unidirectional prediction area and the bidirectional prediction area by using at least one among motion information of the current block, whether a prediction block of the current block is outside a picture boundary, an area of the prediction block, and whether the current block is in a mode in which both unidirectional prediction and bidirectional prediction are used.

The processor may be configured to: in case that the current block is a boundary block including a boundary of a current picture including the current block, acquire a padding reference block from a reference picture based on the reference picture and motion information of the boundary block, and generate a padding area adjacent to the boundary block based on the padding reference block; and acquire the padding reference block by using motion information of a block adjacent to the boundary block in case that the boundary block is not reconstructed using an inter mode.

In case that the boundary block is not reconstructed using the inter mode, the block adjacent to the boundary block in the padding area may be generated using a bottom adjacent block as a reference block referenced by an above neighboring block, which is an adjacent neighboring block with respect to a top left position of the boundary block.

The processor may be configured to generate the block adjacent to the boundary block in the padding area by using a first block and a second block in case that the boundary block is reconstructed using bidirectional prediction within the current picture. The first block may be adjacent to a first reference block, which is one of two reference blocks referenced by the boundary block, and the second block may be adjacent to a second reference block, which is a reference block other than the first reference block among the two reference blocks.

A video signal encoding apparatus according to an embodiment of the present disclosure includes a processor.

The processor is configured to acquire a bitstream that is decoded by a decoding method.

The decoding method includes: acquiring motion information from a neighboring block of a current block; and correcting the motion information to acquire motion information of the current block.

The correcting the motion information to acquire the motion information of the current block may include correcting the motion information by using at least one among motion vector difference (MVD), merge mode with MVD (MMVD), template matching (TM), bilateral matching (BM), optical flow-based TM, decoder-side motion vector refinement (DMVR), and multi-pass DMVR.

The correcting the motion information to acquire the motion information of the current block may include determining whether to correct the motion information based on whether adaptive motion vector resolution (AMVR) is used on the current block.

The determining whether to correct the motion information based on whether the AMVR is used on the current block may include determining whether to correct the motion information based on whether adaptive motion vector resolution (AMVR) is used on the current block and whether a motion resolution of the AMVR is set to a predetermined resolution.

The decoding method may further include determining whether to perform adaptive motion vector resolution (AMVR) on the current block based on whether the motion correction has been performed on the current block.

The decoding method may further include determining a boundary between a unidirectional prediction area and a bidirectional prediction area and applying a deblocking filter to the determined boundary.

The determining the boundary between the unidirectional prediction area and the bidirectional prediction area may include determining the boundary between the unidirectional prediction area and the bidirectional prediction area by using at least one among motion information of the current block, whether a prediction block of the current block is outside a picture boundary, an area of the prediction block, and whether the current block is in a mode in which both unidirectional prediction and bidirectional prediction are used.

The decoding method may further include, in case that the current block is a boundary block including a boundary of a current picture including the current block, acquiring a padding reference block from a reference picture based on the reference picture and motion information of the boundary block, and generating a padding area adjacent to the boundary block based on the padding reference block; and acquiring the padding reference block by using motion information of a block adjacent to the boundary block in case that the boundary block is not reconstructed using an inter mode.

In case that the boundary block is not reconstructed using the inter mode, the block adjacent to the boundary block in the padding area may be generated using a bottom adjacent block as a reference block referenced by an above neighboring block, which is an adjacent neighboring block with respect to a top left position of the boundary block.

According to an embodiment of the present disclosure, in a computer-readable non-transitory storage medium for storing a bitstream, the bitstream may be decoded by a decoding method. The decoding method may include: acquiring motion information from a neighboring block of a current block; and correcting the motion information to acquire motion information of the current block.

Advantageous Effects of Invention

The present disclosure provides a method for efficiently processing a video signal. The effects that can be obtained from the present specification is not limited to the effects described above, and other effects not described will be clearly understood by those skilled in the art to which the present disclosure pertains from the following description.

BRIEF DESCRIPTION OF DRAWINGS

FIG. 20 illustrates parsing information signaling the presence or absence of a difference value when the presence or absence of the difference value is signaled according to an embodiment of the present disclosure.

FIG. 21 illustrates the operation of an encoder and the operation of a decoder when adaptive motion vector resolution (AMVR) and motion correction are used in combination according to an embodiment of the present disclosure.

BEST MODE FOR CARRYING OUT THE INVENTION

Figure 1:
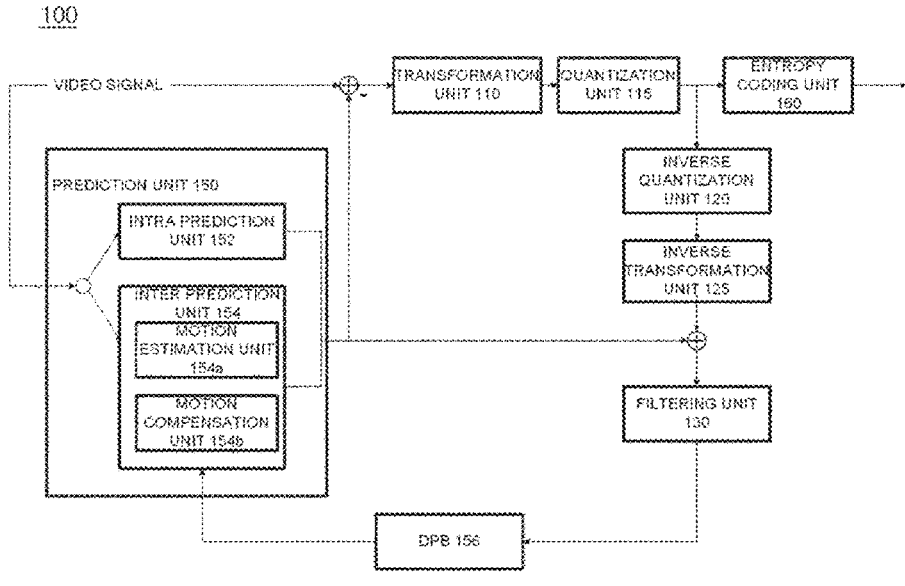
FIG. 1 is a schematic block diagram of a video signal encoding apparatus according to an embodiment of the present disclosure.

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, 'A and/or B' may be interpreted as meaning 'including at least one of A or B.'

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. Furthermore, a "block" refers to a region of an image that includes a particular component of a luma component and chroma components (i.e., Cb and Cr). However, depending on the embodiment, the terms "unit", "block", "partition", "signal", and "region" may be used interchangeably. Also, in the present specification, the term "current block" refers to a block that is currently scheduled to be encoded, and the term "reference block" refers to a block that has already been encoded or decoded and is used as a reference in a current block. In addition, the terms "luma", "luminance", "Y", and the like may be used interchangeably in this specification. Additionally, in the present specification, the terms "chroma", "chrominance", "Cb or Cr", and the like may be used interchangeably, and chroma components are classified into two components, Cb and Cr, and thus each chroma component may be distinguished and used. Additionally, in the present specification, the term "unit" may be used as a concept that includes a coding unit, a prediction unit, and a transform unit. A "picture" refers to a field or a frame, and depending on embodiments, the terms may be used interchangeably. Specifically, when a captured video is an interlaced video, a single frame may be separated into an odd (or cardinal or top) field and an even (or even-numbered or bottom) field, and each field may be configured in one picture unit and encoded or decoded. If the captured video is a progressive video, a single frame may be configured as a picture and encoded or decoded. In addition, in the present specification, the terms "error signal", "residual signal", "residue signal", "remaining signal", and "difference signal" may be used interchangeably. Also, in the present specification, the terms "intra-prediction mode", "intra-prediction directional mode", "intra-picture prediction mode", and "intra-picture prediction directional mode" may be used interchangeably. In addition, in the present specification, the terms "motion", "movement", and the like may be used interchangeably. Also, in the present specification, the terms "left", "left above", "above", "right above", "right", "right below", "below", and "left below" may be used interchangeably with "leftmost", "top left", "top", "top right", "right", "bottom right", "bottom", and "bottom left". Also, the terms "element" and "member" may be used interchangeably. Picture order count (POC) represents temporal position information of pictures (or frames), and may be the playback order in which displaying is performed on a screen, and each picture may have unique POC.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. A transform kernel used for the transform of a residual block may has characteristics that allow a vertical transform and a horizontal transform to be separable. In this case, the transform of the residual block may be performed separately as a vertical transform and a horizontal transform. For example, an encoder may perform a vertical transform by applying a transform kernel in the vertical direction of a residual block. In addition, the encoder may perform a horizontal transform by applying the transform kernel in the horizontal direction of the residual block. In the present disclosure, the transform kernel may be used to refer to a set of parameters used for the transform of a residual signal, such as a transform matrix, a transform array, a transform function, or transform. For example, a transform kernel may be any one of multiple available kernels. Also, transform kernels based on different transform types may be used for the vertical transform and the horizontal transform, respectively.

The transform coefficients are distributed with higher coefficients toward the top left of a block and coefficients closer to "0" toward the bottom right of the block. As the size of a current block increases, there are likely to be many coefficients of "0" in the bottom-right region of the block. To reduce the transform complexity of a large-sized block, only a random top-left region may be kept and the remaining region may be reset to "0".

In addition, error signals may be present in only some regions of a coding block. In this case, the transform process may be performed on only some random regions. In an embodiment, in a block having a size of 2N×2N, an error signal may be present only in the first 2N×N block, and the transform process may be performed on the first 2N×N block. However, the second 2N×N block may not be transformed and may not be encoded or decoded. Here, N may be any positive integer.

The encoder may perform an additional transform before transform coefficients are quantized. The above-described transform method may be referred to as a primary transform, and the additional transform may be referred to as a secondary transform. The secondary transform may be selective for each residual block. According to an embodiment, the encoder may improve coding efficiency by performing a secondary transform for regions where it is difficult to focus energy in a low-frequency region by using a primary transform alone. For example, a secondary transform may be additionally performed for blocks where residual values appear large in directions other than the horizontal or vertical direction of a residual block. Unlike a primary transform, a secondary transform may not be performed separately as a vertical transform and a horizontal transform. Such a secondary transform may be referred to as a low frequency non-separable transform (LFNST).

The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The deblocking filter is a filter for removing intra-block distortions generated at the boundaries between blocks in a reconstructed picture. Through the distribution of pixels included in several columns or rows based on random edges in a block, the encoder may determine whether to apply a deblocking filter to the edges. When applying a deblocking filter to the block, the encoder may apply a long filter, a strong filter, or a weak filter depending on the strength of deblocking filtering. Additionally, horizontal filtering and vertical filtering may be processed in parallel. The sample adaptive offset (SAO) may be used to correct offsets from an original video on a pixel-by-pixel basis with respect to a residual block to which a deblocking filter has been applied. To correct offset for a particular picture, the encoder may use a technique that divides pixels included in the picture into a predetermined number of regions, determines a region in which the offset correction is to be performed, and applies the offset to the region (Band Offset). Alternatively, the encoder may use a method for applying an offset in consideration of edge information of each pixel (Edge Offset). The adaptive loop filter (ALF) is a technique of dividing pixels included in a video into predetermined groups and then determining one filter to be applied to each group, thereby performing filtering differently for each group. Information about whether to apply ALF may be signaled on a per-coding unit basis, and the shape and filter coefficients of an ALF to be applied may vary for each block. In addition, an ALF filter having the same shape (a fixed shape) may be applied regardless of the characteristics of a target block to which the ALF filter is to be applied.

The prediction unit 150 includes an intra-prediction unit 152 and an inter-prediction unit 154. The intra-prediction unit 152 performs intra prediction within a current picture, and the inter-prediction unit 154 performs inter prediction to predict the current picture by using a reference picture stored in the decoded picture buffer 156. The intra-prediction unit 152 performs intra prediction from reconstructed regions in the current picture and transmits intra encoding information to the entropy coding unit 160. The intra encoding information may include at least one of an intra-prediction mode, a most probable mode (MPM) flag, an MPM index, and information regarding a reference sample. The inter-prediction unit 154 may again include a motion estimation unit 154a and a motion compensation unit 154b. The motion estimation unit 154a finds a part most similar to a current region with reference to a specific region of a reconstructed reference picture, and obtains a motion vector value which is the distance between the regions. Reference region-related motion information (reference direction indication information (L0 prediction, L1 prediction, or bidirectional prediction), a reference picture index, motion vector information, etc.) and the like, obtained by the motion estimation unit 154a, are transmitted to the entropy coding unit 160 so as to be included in a bitstream. The motion compensation unit 154B performs inter-motion compensation by using the motion information transmitted by the motion estimation unit 154a, to generate a prediction block for the current block. The inter-prediction unit 154 transmits the inter encoding information, which includes motion information related to the reference region, to the entropy coding unit 160.

According to an additional embodiment, the prediction unit 150 may include an intra block copy (IBC) prediction unit (not shown). The IBC prediction unit performs IBC prediction from reconstructed samples in a current picture and transmits IBC encoding information to the entropy coding unit 160. The IBC prediction unit references a specific region within a current picture to obtain a block vector value that indicates a reference region used to predict a current region. The IBC prediction unit may perform IBC prediction by using the obtained block vector value. The IBC prediction unit transmits the IBC encoding information to the entropy coding unit 160. The IBC encoding information may include at least one of reference region size information and block vector information (index information for predicting the block vector of a current block in a motion candidate list, and block vector difference information).

When the above picture prediction is performed, the transform unit 110 transforms a residual value between an original picture and a predictive picture to obtain a transform coefficient value. At this time, the transform may be performed on a specific block basis in the picture, and the size of the specific block may vary within a predetermined range.

The quantization unit 115 quantizes the transform coefficient value generated by the transform unit 110 and transmits the quantized transform coefficient to the entropy coding unit 160.

The quantized transform coefficients in the form of a two-dimensional array may be rearranged into a one-dimensional array for entropy coding. In relation to methods for scanning a quantized transform coefficient, the size of a transform block and an intra-picture prediction mode may determine which scanning method is used. In an embodiment, diagonal, vertical, and horizontal scans may be applied. This scan information may be signaled on a block-by-block basis, and may be derived based on predetermined rules.

The entropy coding unit 160 generates a video signal bitstream by entropy coding information indicating a quantized transform coefficient, intra encoding information, and inter encoding information. The entropy coding unit 160 may use variable length coding (VLC) and arithmetic coding. The variable length coding (VLC) is a technique of transforming input symbols into consecutive codewords, wherein the length of the codewords is variable. For example, frequently occurring symbols are represented by shorter codewords, while less frequently occurring symbols are represented by longer codewords. As the variable length coding, context-based adaptive variable length coding (CAVLC) may be used. The arithmetic coding uses the probability distribution of each data symbol to transform consecutive data symbols into a single decimal number. The arithmetic coding allows acquisition of the optimal decimal bits needed to represent each symbol. As the arithmetic coding, context-based adaptive binary arithmetic coding (CABAC) may be used.

CABAC is a binary arithmetic coding technique using multiple context models generated based on probabilities obtained from experiments. First, when symbols are not in binary form, the encoder binarizes each symbol by using exp-Golomb, etc. The binarized value, 0 or 1, may be described as a bin. A CABAC initialization process is divided into context initialization and arithmetic coding initialization. The context initialization is the process of initializing the probability of occurrence of each symbol, and is determined by the type of symbol, a quantization parameter (QP), and slice type (I, P, or B). A context model having the initialization information may use a probability-based value obtained through an experiment. The context model provides information about the probability of occurrence of Least Probable Symbol (LPS) or Most Probable Symbol (MPS) for a symbol to be currently coded and about which of bin values 0 and 1 corresponds to the MPS (valMPS). One of multiple context models is selected via a context index (ctxIdx), and the context index may be derived from information in a current block to be encoded or from information about neighboring blocks. Initialization for binary arithmetic coding is performed based on a probability model selected from the context models. In the binary arithmetic coding, encoding is performed through the process in which division into probability intervals is made through the probability of occurrence of 0 and 1, and then a probability interval corresponding to a bin to be processed becomes the entire probability interval for the next bin to be processed. Information about a position within the last bin in which the last bin has been processed is output. However, the probability interval cannot be divided indefinitely, and thus, when the probability interval is reduced to a certain size, a renormalization process is performed to widen the probability interval and the corresponding position information tion is output. In addition, after each bin is processed, a probability update process may be performed, wherein information about a processed bin is used to set a new probability for the next to be processed.

The generated bitstream is encapsulated in network abstraction layer (NAL) unit as basic units. The NAL units are classified into video a coding layer (VCL) NAL unit, which includes video data, and a non-VCL NAL unit, which includes parameter information for decoding video data. There are various types of VCL or non-VCL NAL units. A NAL unit includes NAL header information and raw byte sequence payload (RBSP) which is data. The NAL header information includes summary information about the RBSP. The RBSP of a VCL NAL unit includes an integer number of encoded coding tree units. In order to decode a bitstream in a video decoder, it is necessary to separate the bitstream into NAL units and then decode each of the separate NAL units. Information required for decoding a video signal bitstream may be included in a picture parameter set (PPS), a sequence parameter set (SPS), a video parameter set (VPS), etc., and transmitted.

The block diagram of FIG. 1 illustrates the encoding device 100 according to an embodiment of the present disclosure, wherein the separately shown blocks logically distinguish the elements of the encoding device 100. Accordingly, the above-described elements of the encoding device 100 may be mounted as a single chip or multiple chips, depending on the design of the device. According to an embodiment, the above-described operation of each element of the encoding device 100 may be performed by a processor (not shown).

Figure 2:
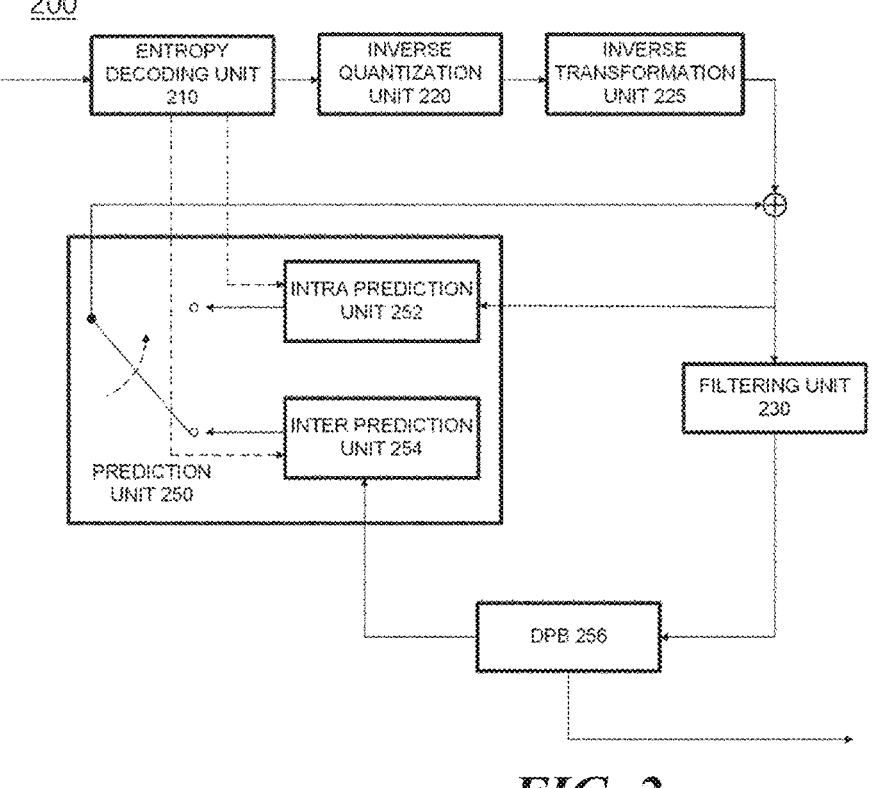
FIG. 2 is a schematic block diagram of a video signal decoding apparatus according to an embodiment of the present disclosure.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures are pictures located temporally before or after the current picture, and may be pictures for which reconstruction has already been completed. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an IBC prediction unit (not shown). The IBC prediction unit may reconstruct the current region by referring to a specific region including reconstructed samples in the current picture. The IBC prediction unit obtains IBC encoding information for the current region from the entropy decoding unit 210. The IBC prediction unit obtains a block vector value of the current region indicating the specific region in the current picture. The IBC prediction unit may perform IBC prediction by using the obtained block vector value. The IBC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

The technology proposed in the present specification may be applied to a method and a device for both an encoder and a decoder, and the wording signaling and parsing may be for convenience of description. In general, signaling may be described as encoding each type of syntax from the perspective of the encoder, and parsing may be described as interpreting each type of syntax from the perspective of the decoder. In other words, each type of syntax may be included in a bitstream and signaled by the encoder, and the decoder may parse the syntax and use the syntax in a reconstruction process. In this case, the sequence of bits for each type of syntax arranged according to a prescribed hierarchical configuration may be called a bitstream.

One picture may be partitioned into sub-pictures, slices, tiles, etc. and encoded. A sub-picture may include one or more slices or tiles. When one picture is partitioned into multiple slices or tiles and encoded, all the slices or tiles within the picture must be decoded before the picture can be output a screen. On the other hand, when one picture is encoded into multiple subpictures, only a random subpicture may be decoded and output on the screen. A slice may include multiple tiles or subpictures. Alternatively, a tile may include multiple subpictures or slices. Subpictures, slices, and tiles may be encoded or decoded independently of each other, and thus are advantageous for parallel processing and processing speed improvement. However, there is the disadvantage in that a bit rate increases because encoded information of other adjacent subpictures, slices, and tiles is not available. A subpicture, a slice, and a tile may be partitioned into multiple coding tree units (CTUs) and encoded.

Figure 3:
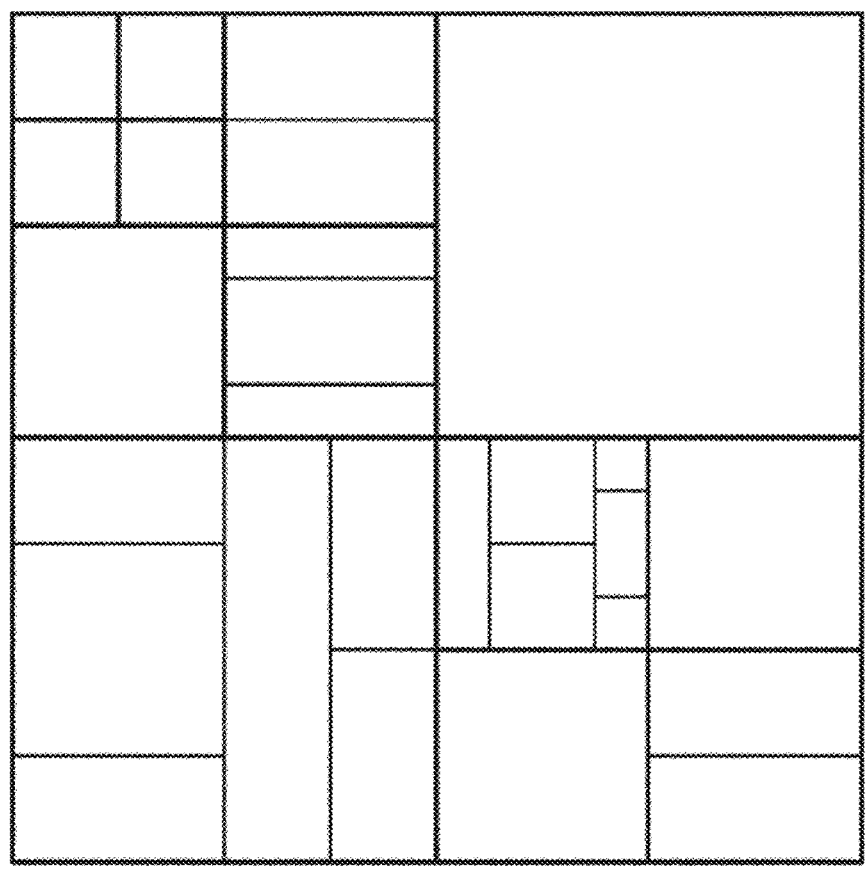
FIG. 3 shows an embodiment in which a coding tree unit is divided into coding units in a picture.

FIG. 3 illustrates an embodiment in which a coding tree unit (CTU) is divided into coding units (CUs) within a picture. In the process of coding a video signal, a picture may be divided into a sequence of coding tree units (CTUs). A coding tree unit may include a luma Coding Tree Block (CTB), two chroma coding tree blocks, and encoded syntax information thereof. One coding tree unit may include one coding unit, or one coding tree unit may be divided into multiple coding units. One coding unit may include a luma coding block (CB), two chroma coding blocks, and encoded syntax information thereof. One coding block may be partitioned into multiple sub-coding blocks. One coding unit may include one transform unit (TU), or one coding unit may be partitioned into multiple transform units. A transform unit may include a luma transform block (TB), two chroma transform blocks, and encoded syntax information thereof. A coding tree unit may be partitioned into multiple coding units. A coding tree unit may become a leaf node without being partitioned. In this case, the coding tree unit itself may be a coding unit.

The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

A leaf node of the multi-type tree can be a coding unit. When the coding unit is not greater than the maximum transform length, the coding unit can be used as a unit of prediction and/or transform without further splitting. As an embodiment, when the width or height of the current coding unit is greater than the maximum transform length, the current coding unit can be split into a plurality of transform units without explicit signaling regarding splitting. On the other hand, at least one of the following parameters in the above-described quad tree and multi-type tree may be pre-defined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
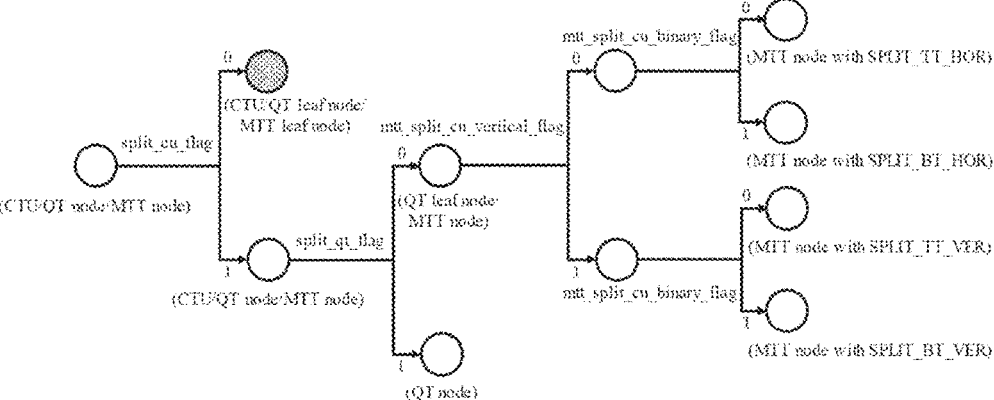
FIG. 4 shows an embodiment of a method for signaling a division of a quad tree and a multi-type tree.

FIG. 4 illustrates an embodiment of a method of signaling splitting of the quad tree and multi-type tree. Preset flags can be used to signal the splitting of the quad tree and multi-type tree described above. Referring to FIG. 4, at least one of a flag 'split_cu_flag' indicating whether or not to split a node, a flag 'split_qt_flag' indicating whether or not to split a quad tree node, a flag 'mtt_split_cu_vertical_flag' indicating a splitting direction of the multi-type tree node, or a flag 'mtt_split_cu_binary_flag' indicating a splitting shape of the multi-type tree node can be used.

According to an embodiment of the present invention, 'split_cu_flag', which is a flag indicating whether or not to split the current node, can be signaled first. When the value of 'split_cu_flag' is 0, it indicates that the current node is not split, and the current node becomes a coding unit. When the current node is the coating tree unit, the coding tree unit includes one unsplit coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes the coding unit.

When the value of 'split_cu_flag' is 1, the current node can be split into nodes of the quad tree or multi-type tree according to the value of 'split_qt_flag'. A coding tree unit is a root node of the quad tree, and can be split into a quad tree structure first. In the quad tree structure, 'split_qt_flag' is signaled for each node 'QT node'. When the value of 'split_qt_flag' is 1, the corresponding node is split into 4 square nodes, and when the value of 'qt_split_flag' is 0, the corresponding node becomes the 'QT leaf node' of the quad tree, and the corresponding node is split into multi-type nodes. According to an embodiment of the present invention, quad tree splitting can be limited according to the type of the current node. Quad tree splitting can be allowed when the current node is the coding tree unit (root node of the quad tree) or the quad tree node, and quad tree splitting may not be allowed when the current node is the multi-type tree node. Each quad tree leaf node 'QT leaf node' can be further split into a multi-type tree structure. As described above, when 'split_qt_flag' is 0, the current node can be split into multi-type nodes. In order to indicate the splitting direction and the splitting shape, 'mtt_split_cu_vertical_flag' and 'mtt_split_cu_binary_flag' can be signaled. When the value of 'mtt_split_cu_vertical_flag' is 1, vertical splitting of the node 'MTT node' is indicated, and when the value of 'mtt_split_cu_vertical_flag' is 0, horizontal splitting of the node 'MTT node' is indicated. In addition, when the value of 'mtt_split_cu_binary_flag' is 1, the node 'MTT node' is split into two rectangular nodes, and when the value of 'mtt_split_cu_binary_flag' is 0, the node 'MTT node' is split into three rectangular nodes.

In the tree partitioning structure, a luma block and a chroma block may be partitioned in the same form. That is, a chroma block may be partitioned by referring to the partitioning form of a luma block. When a current chroma block is less than a predetermined size, a chroma block may not be partitioned even if a luma block is partitioned.

In the tree partitioning structure, a luma block and a chroma block may have different forms. In this case, luma block partitioning information and chroma block partitioning information may be signaled separately. Furthermore, in addition to the partitioning information, luma block encoding information and chroma block encoding information may also be different from each other. In one example, the luma block and the chroma block may be different in at least one among intra encoding mode, encoding information for motion information, etc.

A node to be split into the smallest units may be treated as one coding block. When a current block is a coding block, the coding block may be partitioned into several sub-blocks (sub-coding blocks), and the sub-blocks may have the same prediction information or different pieces of prediction information. In one example, when a coding unit is in an intra mode, intra-prediction modes of sub-blocks may be the same or different from each other. Also, when the coding unit is in an inter mode, sub-blocks may have the same motion information or different pieces of the motion information. Furthermore, the sub-blocks may be encoded or decoded independently of each other. Each sub-block may be distinguished by a sub-block index (sbIdx). Also, when a coding unit is partitioned into sub-blocks, the coding unit may be partitioned horizontally, vertically, or diagonally. In an intra mode, a mode in which a current coding unit is partitioned into two or four sub-blocks horizontally or vertically is called intra sub-partitions (ISP). In an inter mode, a mode in which a current coding block is partitioned diagonally is called a geometric partitioning mode (GPM). In the GPM mode, the position and direction of a diagonal line are derived using a predetermined angle table, and index information of the angle table is signaled.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
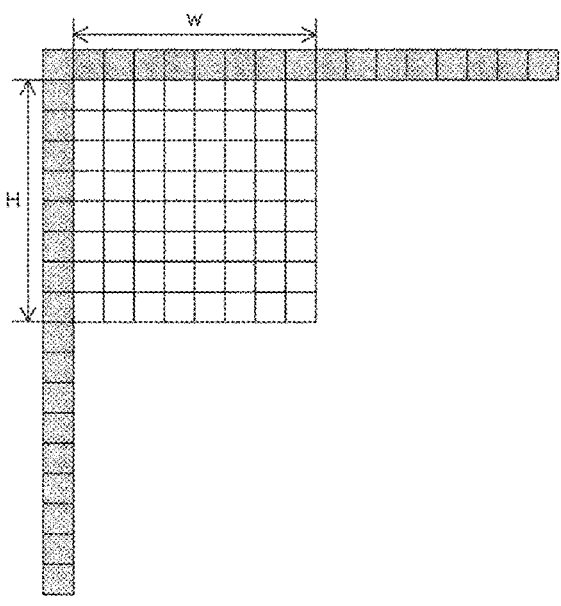
FIGS. 5 and 6 illustrate an intra-prediction method in more detail according to an embodiment of the present disclosure.
Figure 6:
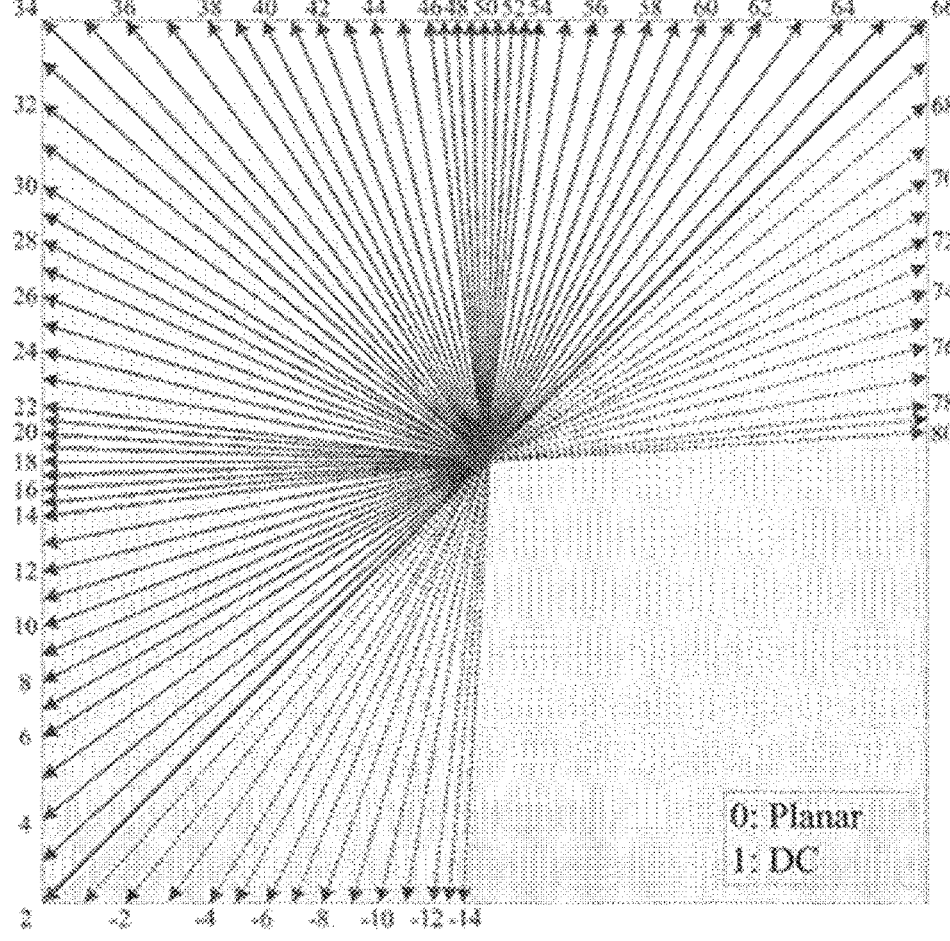

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

Pixels from multiple reference lines may be used for intra prediction of the current block. The multiple reference lines may include n lines located within a predetermined range from the current block. According to an embodiment, when pixels from multiple reference lines are used for intra prediction, separate index information that indicates lines to be set as reference pixels may be signaled, and may be named a reference line index.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range can be set differently depending on a shape of the current block. For example, if the current block is a rectangular block, a wide angle mode indicating an angle exceeding 45 degrees or less than −135 degrees in a clockwise direction can be additionally used. When the current block is a horizontal block, an angle mode can indicate an angle within an angle range (i.e., a second angle range) between (45+offset1) degrees and (−135+offset1) degrees in a clockwise direction. In this case, angle modes 67 to 76 outside the first angle range can be additionally used. In addition, if the current block is a vertical block, the angle mode can indicate an angle within an angle range (i.e., a third angle range) between (45−offset2) degrees and (−135−offset2) degrees in a clockwise direction. In this case, angle modes −10 to −1 outside the first angle range can be additionally used. According to an embodiment of the present disclosure, values of offset1 and offset2 can be determined differently depending on a ratio between the width and height of the rectangular block. In addition, offset1 and offset2 can be positive numbers.

According to a further embodiment of the present invention, a plurality of angle modes configuring the intra prediction mode set can include a basic angle mode and an extended angle mode. In this case, the extended angle mode can be determined based on the basic angle mode.

According to an embodiment, the basic angle mode is a mode corresponding to an angle used in intra prediction of the existing high efficiency video coding (HEVC) standard, and the extended angle mode can be a mode corresponding to an angle newly added in intra prediction of the next generation video codec standard. More specifically, the basic angle mode can be an angle mode corresponding to any one of the intra prediction modes {2, 4, 6, . . . , 66}, and the extended angle mode can be an angle mode corresponding to any one of the intra prediction modes {3, 5, 7, . . . , 65}. That is, the extended angle mode can be an angle mode between basic angle modes within the first angle range. Accordingly, the angle indicated by the extended angle mode can be determined on the basis of the angle indicated by the basic angle mode.

According to another embodiment, the basic angle mode can be a mode corresponding to an angle within a preset first angle range, and the extended angle mode can be a wide angle mode outside the first angle range. That is, the basic angle mode can be an angle mode corresponding to any one of the intra prediction modes {2, 3, 4, . . . , 66}, and the extended angle mode can be an angle mode corresponding to any one of the intra prediction modes {−14, −13, −12, . . . , −1} and {67, 68, . . . , 80}. The angle indicated by the extended angle mode can be determined as an angle on a side opposite to the angle indicated by the corresponding basic angle mode. Accordingly, the angle indicated by the extended angle mode can be determined on the basis of the angle indicated by the basic angle mode. Meanwhile, the number of extended angle modes is not limited thereto, and additional extended angles can be defined according to the size and/or shape of the current block. Meanwhile, the total number of intra prediction modes included in the intra prediction mode set can vary depending on the configuration of the basic angle mode and extended angle mode described above In the embodiments described above, the spacing between the extended angle modes can be set on the basis of the spacing between the corresponding basic angle modes. For example, the spacing between the extended angle modes {3, 5, 7, . . . , 65} can be determined on the basis of the spacing between the corresponding basic angle modes {2, 4, 6, . . . , 66}. In addition, the spacing between the extended angle modes {−14, −13, . . . , −1} can be determined on the basis of the spacing between corresponding basic angle modes {53, 54, . . . , 66} on the opposite side, and the spacing between the extended angle modes {67, 68, . . . , 80} can be determined on the basis of the spacing between the corresponding basic angle modes {2, 3, 4, . . . , 15} on the opposite side. The angular spacing between the extended angle modes can be set to be the same as the angular spacing between the corresponding basic angle modes. In addition, the number of extended angle modes in the intra prediction mode set can be set to be less than or equal to the number of basic angle modes.

According to an embodiment of the present invention, the extended angle mode can be signaled based on the basic angle mode. For example, the wide angle mode (i.e., the extended angle mode) can replace at least one angle mode (i.e., the basic angle mode) within the first angle range. The basic angle mode to be replaced can be a corresponding angle mode on a side opposite to the wide angle mode. That is, the basic angle mode to be replaced is an angle mode that corresponds to an angle in an opposite direction to the angle indicated by the wide angle mode or that corresponds to an angle that differs by a preset offset index from the angle in the opposite direction. According to an embodiment of the present invention, the preset offset index is 1. The intra prediction mode index corresponding to the basic angle mode to be replaced can be remapped to the wide angle mode to signal the corresponding wide angle mode. For example, the wide angle modes {−14, −13, . . . , −1} can be signaled by the intra prediction mode indices {52, 53, . . . , 66}, respectively, and the wide angle modes {67, 68, . . . , 80} can be signaled by the intra prediction mode indices {2, 3, . . . , 15}, respectively. In this way, the intra prediction mode index for the basic angle mode signals the extended angle mode, and thus the same set of intra prediction mode indices can be used for signaling the intra prediction mode even if the configuration of the angle modes used for intra prediction of each block are different from each other. Accordingly, signaling overhead due to a change in the intra prediction mode configuration can be minimized.

Meanwhile, whether or not to use the extended angle mode can be determined on the basis of at least one of the shape and size of the current block. According to an embodiment, when the size of the current block is greater than a preset size, the extended angle mode can be used for intra prediction of the current block, otherwise, only the basic angle mode can be used for intra prediction of the current block. According to another embodiment, when the current block is a block other than a square, the extended angle mode can be used for intra prediction of the current block, and when the current block is a square block, only the basic angle mode can be used for intra prediction of the current block.

The intra-prediction unit determines reference samples and/or interpolated reference samples to be used for intra prediction of the current block, based on the intra-prediction mode information of the current block. When the intra-prediction mode index indicates a specific angular mode, a reference sample corresponding to the specific angle or an interpolated reference sample from current samples in the current block is used for prediction of a current pixel. Thus, different sets of reference samples and/or interpolated reference samples may be used for intra prediction depending on the intra-prediction mode. After the intra prediction of the current block is performed using the reference samples and the intra-prediction mode information, the decoder reconstructs sample values of the current block by adding the residual signal of the current block, which has been obtained from the inverse transform unit, to the intra-prediction value of the current block.

Motion information used for inter prediction may include reference direction indication information (inter_pred_idc), reference picture index (ref_idx_l0, ref_idx_l1), and motion vector (mvL0, mvL1). Reference picture list utilization information (predFlagL0, predFlagL1) may be set based on the reference direction indication information. In one example, for a unidirectional prediction using an L0 reference picture, predFlagL0=1 and predFlagL1=0 may be set. For a unidirectional prediction using an L1 reference picture, predFlagL0=0 and predFlagL1=1 may be set. For bidirectional prediction using both the L0 and L1 reference pictures, predFlagL0=1 and predFlagL1=1 may be set.

When the current block is a coding unit, the coding unit may be partitioned into multiple sub-blocks, and the sub-blocks have the same prediction information or different pieces of prediction information. In one example, when the coding unit is in an intra mode, intra-prediction modes of the sub-blocks may be the same or different from each other. Also, when the coding unit is in an inter mode, the sub-blocks may have the same motion information or different pieces of motion information. Furthermore, the sub-blocks may be encoded or decoded independently of each other. Each sub-block may be distinguished by a sub-block index (sbIdx).

The motion vector of the current block is likely to be similar to the motion vector of a neighboring block. Therefore, the motion vector of the neighboring block may be used as a motion vector predictor (MVP), and the motion vector of the current block may be derived using the motion vector of the neighboring block. Furthermore, to improve the accuracy of the motion vector, the motion vector difference (MVD) between the optimal motion vector of the current block and the motion vector predictor found by the encoder from an original video may be signaled.

The motion vector may have various resolutions, and the resolution of the motion vector may vary on a block-by-block basis. The motion vector resolution may be expressed in integer units, half-pixel units, $\frac{1}{4}$ pixel units, $\frac{1}{16}$ pixel units, 4-integer pixel units, etc. A video, such as screen content, has a simple graphical form such as text, and does not require an interpolation filter to be applied. Thus, integer units and 4-integer pixel units may be selectively applied on a block-by-block basis. A block encoded using an affine mode, which represent rotation and scale, exhibit significant changes in form, so integer units, $\frac{1}{4}$ pixel units, and $\frac{1}{16}$ pixel units may be applied selectively on a block-by-block basis. Information about whether to selectively apply motion vector resolution on a block-by-block basis is signaled by amvr_flag. If applied, information about a motion vector resolution to be applied to the current block is signaled by amvr_precision_idx.

In the case of blocks to which bidirectional prediction is applied, weights applied between two prediction blocks may be equal or different, and information about the weights is signaled via BCW_IDX.

In order to improve the accuracy of the motion vector predictor, a merge or AMVP (advanced motion vector prediction) method may be selectively used on a block-by-block basis. The merge method is a method that configures motion information of a current block to be the same as motion information of a neighboring block adjacent to the current block, and is advantageous in that the motion information is spatially propagated without change in a motion region with homogeneity, and thus the encoding efficiency of the motion information is increased. On the other hand, the AMVP method is a method for predicting motion information in L0 and L1 prediction directions respectively and signaling the most optimal motion information in order to represent accurate motion information. The decoder derives motion information for a current block by using the AMVP or merge method, and then uses a reference block, located in the motion information in a reference picture, as a prediction block for the current block.

A method of deriving motion information in Merge or AMVP involves a method for constructing a motion candidate list using motion vector predictors derived from neighboring blocks of the current block, and then signaling index information for the optimal motion candidate. In the case of AMVP, motion candidate lists are derived for L0 and L1, respectively, so the most optimal motion candidate indexes (mvp_l0_flag, mvp_l1_flag) for L0 and L1 are signaled, respectively. In the case of Merge, a single move candidate list is derived, so a single merge index (merge_idx) is signaled. There may be various motion candidate lists derived from a single coding unit, and a motion candidate index or a merge index may be signaled for each motion candidate list. In this case, a mode in which there is no information about residual blocks in blocks encoded using the merge mode may be called a MergeSkip mode.

Bidirectional movement information for the current block may be derived by using AMVP and Merge modes in combination. For example, motion information in the L0 direction may be derived using the AMVP method, and motion information in the L1 direction may be derived using the Merge method. Conversely, Merge may be applied to L0 and AMVP to L1. This encoding mode may be called AMVP-merge mode.

Symmetric MVD (SMVD) is a method which makes motion vector difference (MVD) values in the L0 and L1 directions symmetrical in the case of bi-directional prediction, thereby reducing the bit rate of motion information transmitted. The MVD information in the L1 direction that is symmetrical to the L0 direction is not transmitted, and reference picture information in the L0 and L1 directions is also not transmitted, but is derived during decoding.

Overlapped block motion compensation (OBMC) is a method in which, when blocks have different pieces of motion information, prediction blocks for a current block are generated by using motion information of neighboring blocks, and the prediction blocks are then weighted averaged to generate a final prediction block for the current block. This has the effect of reducing the blocking phenomenon that occurs at the block edges in a motion-compensated video.

Generally, a merged motion candidate has low motion accuracy. To improve the accuracy of the merge motion candidate, a merge mode with MVD (MMVD) method may be used. The MMVD method is a method for correcting motion information by using one candidate selected from several motion difference value candidates. Information about a correction value of the motion information obtained by the MMVD method (e.g., an index indicating one candidate selected from among the motion difference value candidates, etc.) may be included in a bitstream and transmitted to the decoder. By including the information about the correction value of the motion information in the bit-stream, a bit rate may be saved compared to including an existing motion information difference value in a bitstream.

A template matching (TM) method is a method of con-figuring a template through a neighboring pixel of a current block, searching for a matching area most similar to the template, and correcting motion information. Template matching (TM) is a method of performing motion prediction by a decoder without including motion information in a bitstream so as to reduce the size of an encoded bitstream. The decoder does not have an original image, and thus may schematically derive motion information of a current block by using a pre-reconstructed neighboring block.

A Decoder-side Motion Vector Refinement (DMVR) method is a method for correcting motion information through the correlation of already restored reference videos in order to find more accurate motion information. The DMVR method is a method which uses the bidirectional motion information of a current block to use, within prede-termined regions of two reference pictures, a point with the best matching between reference blocks in the reference pictures as a new bidirectional motion. When the DMVR method is performed, the encoder may perform DMVR on one block to correct motion information, and then partition the block into sub-blocks and perform DMVR on each sub-block to correct motion information of the sub-block again, and this may be referred to as multi-pass DMVR (MP-DMVR).

A local illumination compensation (LIC) method is a method for compensating for changes in luma between blocks, and is a method which derives a linear model by using neighboring pixels adjacent to a current block, and then compensate for luma information of the current block by using the linear model.

Existing video encoding methods perform motion com-pensation by considering only parallel movements in upward, downward, leftward, and rightward directions, thus reducing the encoding efficiency when encoding videos that include movements such as zooming, scaling, and rotation that are commonly encountered in real life. To express the movements such as zooming, scaling, and rotation, affine model-based motion prediction techniques using four (rota-tion) or six (zooming, scaling, rotation) parameter models may be applied.

Bi-directional optical flow (BDOF) is used to correct a prediction block by estimating the amount of change in pixels on an optical-flow basis from a reference block of blocks with bi-directional motion. Motion information derived by the BDOF of VVC may be used to correct the motion of a current block.

Prediction refinement with optical flow (PROF) is a technique for improving the accuracy of affine motion prediction for each sub-block so as to be similar to the accuracy of motion prediction for each pixel. Similar to BDOF, PROF is a technique that obtains a final prediction signal by calculating a correction value for each pixel with respect to pixel values in which affine motion is compen-sated for each sub-block based on optical-flow.

The combined inter-/intra-picture prediction (CIIP) method is a method for generating a final prediction block by performing weighted averaging of a prediction block gen-erated by an intra-picture prediction method and a prediction block generated by an inter-picture prediction method when generating a prediction block for the current block.

The intra block copy (IBC) method is a method for finding a part, which is most similar to a current block, in an already reconstructed region within a current picture and using the reference block as a prediction block for the current block. In this case, information related to a block vector, which is the distance between the current block and the reference block, may be included in a bitstream. The decoder can parse the information related to the block vector contained in the bitstream to calculate or set the block vector for the current block.

The bi-prediction with CU-level weights (BCW) method is a method in which with respect to two motion-compen-sated prediction blocks from different reference pictures, weighted averaging of the two prediction blocks is per-formed by adaptively applying weights on a block-by-block basis without generating the prediction blocks using an average.

The multi-hypothesis prediction (MHP) method is a method for performing weighted prediction through various prediction signals by transmitting additional motion infor-mation in addition to unidirectional and bidirectional motion information during inter-picture prediction.

A cross-component linear model (CCLM) is a method for configuring a linear model by using a high correlation between a luma signal and a chroma signal at the same location as the corresponding luma signal, and then predict-ing a chroma signal through the corresponding linear model. After a template is configured using a block completed to be reconstructed from among neighboring blocks adjacent to a current block, and then a parameter for the linear model is derived through the template. Next, a current luma block selectively reconstructed according to the size of the chroma block according to a video format is down-sampled. Lastly, a chroma component block of the current block is predicted using the down-sampled luma component block (sample) and the corresponding linear model. In this case, the method using two or more linear models is called a multi-model linear mode (MMLM).

In independent scalar quantization, reconstructed coeffi-cient $t'k$ for input coefficient $tk$ is only dependent on quan-tization index $qk$. That is, a quantization index for any reconstructed coefficient has a value different from those of quantization indices for other reconstructed coefficients. In this case, $t'k$ may be a value obtained by adding a quanti-zation error to $tk$, and may vary or remain the same according to a quantization parameter. Here, $t'k$ may be also referred to as a reconstructed transform coefficient or a de-quantized transform coefficient, and the quantization index may be also referred to as a quantized transform coefficient.

In uniform reconstruction quantization (URQ), recon-structed coefficients have the characteristic of being arrange-ment at equal intervals. The distance between two adjacent reconstructed values may be called a quantization step size. The reconstructed values may include 0, and the entire set of available reconstructed values may be uniquely defined based on the quantization step size. The quantization step size may vary depending on quantization parameters.

In the existing methods, quantization reduces the set of acceptable reconstructed transform coefficients, and ele-ments of the set may be finite. Thus, there are limitation in minimizing the average error between an original video and a reconstructed video. Vector quantization may be used as a method for minimizing the average error.

A simple form of vector quantization used in video encoding is sign data hiding. This is a method in which the encoder does not encode a sign for one non-zero coefficient and the decoder determines the sign for the coefficient based on whether the sum of absolute values of all the coefficients is even or odd. To this end, in the encoder, at least one coefficient may be incremented or decremented by "1", and the at least one coefficient may be selected and have a value adjusted so as to be optimal from the perspective of rate-distortion cost. In one example, a coefficient with a value close to the boundary between the quantization intervals may be selected.

Another vector quantization method is trellis-coded quantization, and, in video encoding, is used as an optimal path-searching technique to obtain optimized quantization values in dependent quantization. On a block-by-block basis, quantization candidates for all coefficients in a block are placed in a trellis graph, and the optimal trellis path between optimized quantization candidates is found by considering rate-distortion cost. Specifically, the dependent quantization applied to video encoding may be designed such that a set of acceptable reconstructed transform coefficients with respect to transform coefficients depends on the value of a transform coefficient that precedes a current transform coefficient in the reconstruction order. At this time, by selectively using multiple quantizers according to the transform coefficients, the average error between the original video and the reconstructed video is minimized, thereby increasing the encoding efficiency.

Among intra prediction encoding techniques, the matrix intra prediction (MIP) method is a matrix-based intra prediction method, and obtains a prediction signal by using a predefined matrix and offset values through pixels on the left and top of a neighboring block, unlike a prediction method having directionality from pixels of neighboring blocks adjacent to a current block.

To derive an intra-prediction mode for a current block, on the basis of a template which is a random reconstructed region adjacent to the current block, an intra-prediction mode for a template derived through neighboring pixels of the template may be used to reconstruct the current block. First, the decoder may generate a prediction template for the template by using neighboring pixels (references) adjacent to the template, and may use an intra-prediction mode, which has generated the most similar prediction template to an already reconstructed template, to reconstruct the current block. This method may be referred to as template intra mode derivation (TIMD).

In general, the encoder may determine a prediction mode for generating a prediction block and generate a bitstream including information about the determined prediction mode. The decoder may parse a received bitstream to set an intra-prediction mode. In this case, the bit rate of information about the prediction mode may be approximately 10% of the total bitstream size. To reduce the bit rate of information about the prediction mode, the encoder may not include information about an intra-prediction mode in the bitstream. Accordingly, the decoder may use the characteristics of neighboring blocks to derive (determine) an intra-prediction mode for reconstruction of a current block, and may use the derived intra-prediction mode to reconstruct the current block. In this case, to derive the intra-prediction mode, the decoder may apply a Sobel filter horizontally and vertically to each neighboring pixel adjacent to the current block to infer directional information, and then map the directional information to the intra-prediction mode. The method by which the decoder derives the intra-prediction mode using neighboring blocks may be described as decoder side intra mode derivation (DIMD).

Figure 7:
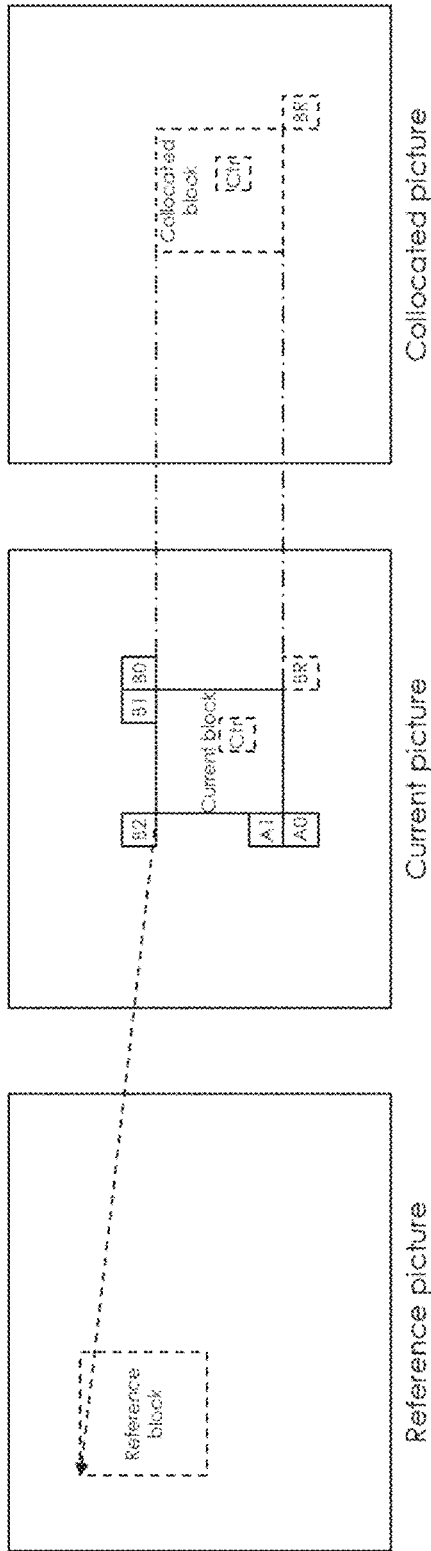
FIG. 7 illustrates the position of neighboring blocks used to construct a motion candidate list in inter prediction.

FIG. 7 illustrates the position of neighboring blocks used to construct a motion candidate list in inter prediction.

The neighboring blocks may be spatially located blocks or temporally located blocks. A neighboring block that is spatially adjacent to a current block may be at least one among a left (A1) block, a left below (A0) block, an above (B1) block, an above right (B0) block, or an above left (B2) block. A neighboring block that is temporally adjacent to the current block may be a block in a collocated picture, which includes the position of a top left pixel of a bottom right (BR) block of the current block. When a neighboring block temporally adjacent to the current block is encoded using an intra mode, or when the neighboring block temporally adjacent to the current block is positioned not to be used, a block, which includes a horizontal and vertical center (Ctr) pixel position in the current block, in the collocated picture corresponding to the current picture may be used as a temporal neighboring block. Motion candidate information derived from the collocated picture may be referred to as a temporal motion vector predictor (TMVP). Only one TMVP may be derived from one block. One block may be partitioned into multiple sub-blocks, and a TMVP candidate may be derived for each sub-block. A method for deriving TMVPs on a sub-block basis may be referred to as sub-block temporal motion vector predictor (sbTMVP).

Whether methods described in the present specification are to be applied may be determined on the basis of at least one of pieces of information relating to slice type information (e.g., whether a slice is an I slice, a P slice, or a B slice), whether the current block is a tile, whether the current block is a subpicture, the size of a current block, the depth of a coding unit, whether a current block is a luma block or a chroma block, whether a frame is a reference frame or a non-reference frame, and a temporal layer corresponding a reference sequence and a layer. Pieces of information used to determine whether methods described in the present specification are to be applied may be pieces of information promised between a decoder and an encoder in advance. In addition, such pieces of information may be determined according to a profile and a level. Such pieces of information may be expressed by a variable value, and a bitstream may include information on a variable value. That is, a decoder may parse information on a variable value included in a bitstream to determine whether the above methods are applied. For example, whether the above methods are to be applied may be determined on the basis of the width length or the height length of a coding unit. If the width length or the height length is equal to or greater than 32 (e.g., 32, 64, or 128), the above methods may be applied. If the width length or the height length is smaller than 32 (e.g., 2, 4, 8, or 16), the above methods may be applied. If the width length or the height length is equal to 4 or 8, the above methods may be applied.

Figure 8:
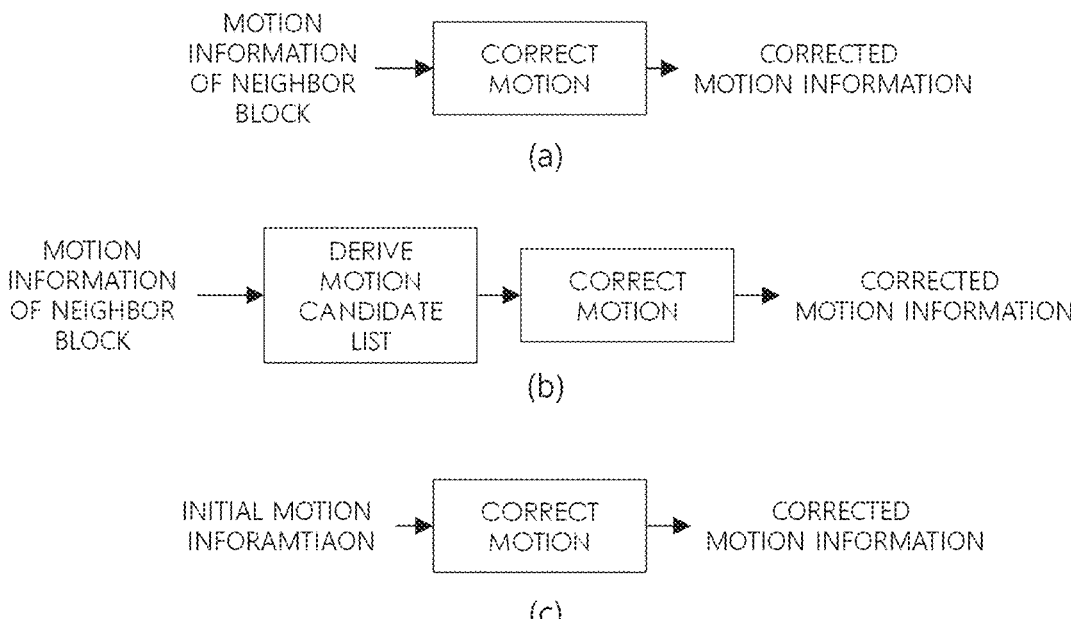
FIG. 8 illustrates that a decoder according to an embodiment of the present disclosure corrects motion information derived from a neighboring block of a current block.

FIG. 8 illustrates that a decoder according to an embodiment of the present disclosure corrects motion information derived from a neighboring block of a current block.

In the present specification, motion information may be used to refer to a motion vector. The decoder may acquire motion information from a neighboring block or acquire initial motion information of a current block, and may correct (refine) the acquired motion information to acquire motion information of the current block. The decoder may use at least one among motion vector difference (MVD), merge mode with MVD (MMVD), template matching (TM), bilateral matching (BM), optical flow-based TM, decoder-side motion vector refinement (DMVR), and multi-pass DMVR, which have been described above.

(a) of FIG. 8 shows that the decoder acquires motion information from a neighboring block of a current block and corrects the acquired motion information. Furthermore, (b) of FIG. 8 shows that the decoder derives motion candidate lists from neighboring blocks of a current block, and corrects motion information of each of the motion candidate lists. Furthermore, (c) of FIG. 8 shows that the decoder acquires initial motion information of a current block and corrects the initial motion information.

Figure 9:
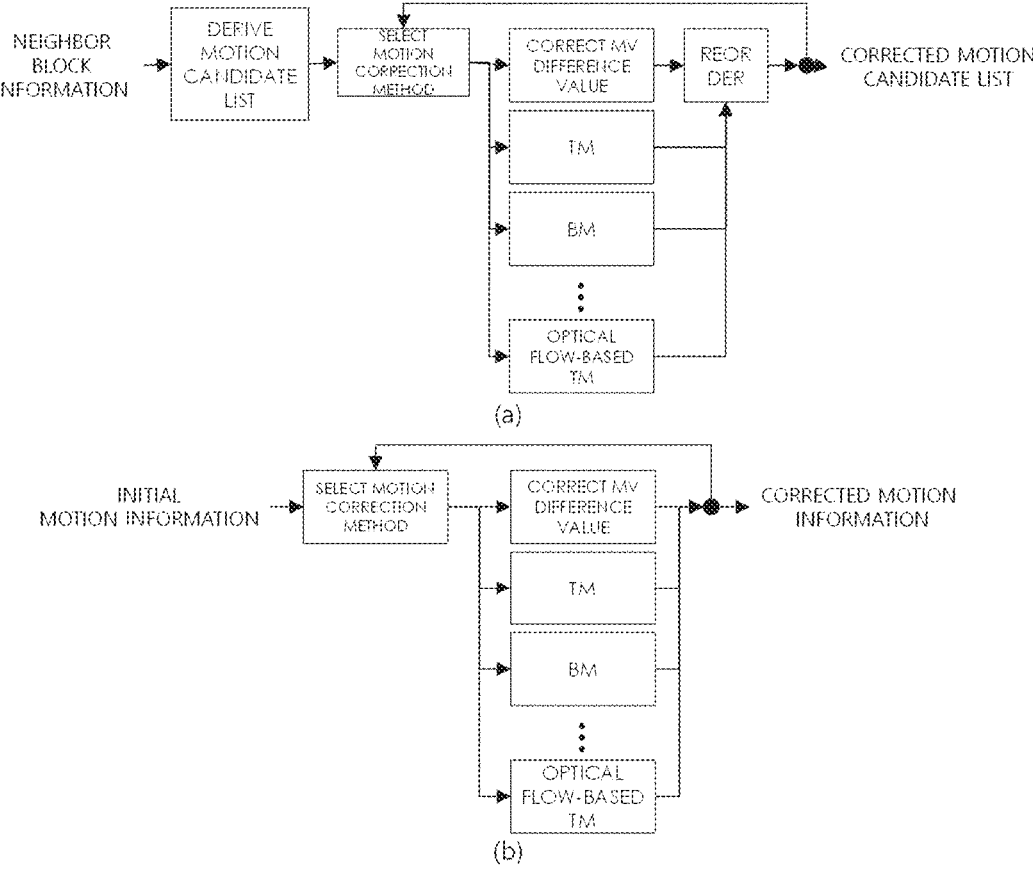
FIG. 9 illustrates a method for acquiring a corrected motion candidate list or corrected motion information according to an embodiment of the present disclosure.

FIG. 9 illustrates a method for acquiring a corrected motion candidate list or corrected motion information according to an embodiment of the present disclosure.

As described above, a decoder may acquire a motion candidate list based on neighboring block information, and may correct motion information of the acquired motion candidate list. In this case, a motion correction method may be a recursive application of at least one among the above-described MVD, MMVD, TM, BM, optical flow-based TM, DMVR, and multi-pass DMVR. (a) of FIG. 9 illustrates correcting motion information of the motion candidate list by using the motion correction method.

Furthermore, the decoder may acquire initial motion information based on a neighboring block information, and correct the acquired initial motion information. In this case, a motion correction method may be a recursive application of at least one among MVD, MMVD, TM, BM, optical flow-based TM, DMVR, and multi-pass DMVR, which have been described above. (b) of FIG. 9 illustrates correcting the initial motion information by using the motion correction method.

When MVD is used, a correction value for motion information may be included in a bitstream. The decoder may acquire the correction value included in the bitstream, and may correct the motion information by using the acquired correction value. When TM is used, the decoder may construct a template by using the neighboring pixels of a current block, search a reference picture for a matching area that is an area with the highest similarity to the constructed template, and correct motion information by using the found matching area. When BM is used, the decoder may correct motion information by using the similarity between an L0 reference block and an L1 reference block derived based on the motion information of a current block. When optical flow-based TM is used, the decoder may generate a template of an area adjacent to a current block as an optical flow map, and correct motion information by using the optical flow map.

The embodiment of correcting motion information of a motion candidate list, described above with reference to (a) of FIG. 9, may also be applied to a merge mode or an AMVP mode. The decoder may acquire a merge candidate list and correct motion information of merge candidates in the acquired merge candidate list. In this case, the decoder may use at least one among MVD, MMVD, TM, BM, optical flow-based TM, DMVR, and multi-pass DMVR described above. The merge candidate list may be reordered based on the cost of the corrected motion information. This allows an encoder to reduce a residual signal and increase the encoding efficiency. The cost is a value obtained by calculating the difference in distortion between two different areas or blocks, and the cost value may be calculated on a per-pixel basis by using Sum of Absolute Differences (SAD) or Mean-Removed SAD (MRSAD). In TM, cost may be obtained by calculating the difference in distortion between a reference template constructed using the neighboring pixels of the current block and a reference template within a reference video. Here, the reference template may be constructed with the same area size as the reference template and may be constructed based on a position indicated by the motion information of the current block in the reference video. This will be described in detail with reference to FIG. 11.

In a specific embodiment, after the encoder and the decoder generate a merge candidate list, the encoder and the decoder may acquire, based on the TM, a cost of motion information of each merge candidate in the merge candidate list. In this case, the encoder and the decoder may reorder the merge candidate list, based on the acquired cost. The bitstream may include an index indicating a final merge candidate, which is to be used as a motion prediction value of the current block, from the merge candidate list. The decoder may acquire the index indicating the final merge candidate from the bitstream and use motion information of the merge candidate indicated by the index as the motion prediction value. In this case, the decoder may correct the motion prediction value by using at least one among MVD, MMVD, TM, BM, optical flow-based TM, DMVR, and multi-pass DMVR.

To increase the accuracy of a merge motion candidate, MMVD may be used where the bitstream includes a difference value that is used to correct the motion information. When MMVD is used, the decoder may select one from among several motion difference value candidates and correct motion information by using the selected motion difference value candidate. When MMVD is used, the encoding efficiency is higher than when the bitstream directly indicates a motion difference value. However, when MMVD is used, the accuracy may be lower than when the bitstream directly indicate the motion difference value. To increase the accuracy of prediction, the decoder may correct the motion information corrected by the MMVD by using at least one among MVD, MMVD, TM, BM, optical flow-based TM, DMVR, and multi-pass DMVR, which have been described above.

In another specific embodiment, the encoder may use at least one of MVD, MMVD, TM, BM, optical flow-based TM, DMVR, and multi-pass DMVR, which have been described above, to indicate the difference between the corrected motion information and the motion information of the current block via the MMVD. After correcting the motion information by using at least one among MVD, MMVD, TM, BM, optical flow-based TM, DMVR, and multi-pass DMVR described above, the decoder may acquire a correction value by using the MMVD. In this case, the decoder may recorrect the corrected motion information by using the correction value. In these embodiments, the encoder may select whether to signal the correction value via MMVD. Specifically, the encoder may include, in the bitstream, information that indicates whether the correction value is signaled via MMVD. The decoder may acquire information indicating whether the correction value is signaled via MMVD, and may determine, based on the acquired information, whether to acquire the correction value via MMVD. When the correction value is signaled via MMVD, the decoder may acquire the correction value via MMVD. When the correction value is not signaled via MMVD, the decoder may omit the operation of acquiring the correction value via MMVD. In the present specification, the correction value may be a difference value.

When AMVP is used, motion information may be accurate because a bitstream directly indicates a motion difference value. However, the encoder using AMVP may include the motion difference value in the bitstream, and the encoding efficiency may be low. To increase the encoding efficiency, the decoder may correct motion information of a motion candidate list derived via the AMVP by using at least one among MVD, MMVD, TM, BM, optical flow-based TM, DMVR, and multi-pass DMVR, which have been described above.

In a specific embodiment, after the encoder and the decoder generate a motion candidate list, the encoder and the decoder may acquire, based on TM, a cost of motion information of each candidate in the motion candidate list. In this case, the encoder and the decoder may reorder the motion candidate list according to the acquired cost. A bitstream may include an index indicating a final motion candidate, which is to be used as a motion prediction value of a current block, from the motion candidate list. The decoder may acquire the index indicating the final motion candidate from the bitstream and use motion information of the motion candidate indicated by the index as the motion prediction value. In this case, the decoder may correct the motion prediction value by using at least one among MVD, MMVD, TM, BM, optical flow-based TM, DMVR, and multi-pass DMVR.

In another specific embodiment, the encoder may use at least one of MVD, MMVD, TM, BM, optical flow-based TM, DMVR, and multi-pass DMVR described above to indicate the difference between corrected motion information and motion information of a current block via AMVP. The encoder and the decoder may correct motion information by using at least one among MVD, MMVD, TM, BM, optical flow-based TM, DMVR, and multi-pass DMVR described above, and then acquire a correction value by using the AMVP. In this case, the decoder may recorrect the corrected motion information by using the correction value. In these embodiments, the encoder may select whether to signal the correction value via AMVP. Specifically, the encoder may include, in a bitstream, information that indicates whether the correction value is signaled via the AMV. The decoder may acquire the information indicating whether the correction value is signaled via the AMVP, and may determine, based on the acquired information, whether to acquire the correction value via the AMVP. When the correction value is signaled via the AMVP, the decoder may acquire the correction value via the AMVP. When the correction value is not signaled via the AMVP, the decoder may omit the operation for acquiring the correction value via the AMVP. In the present specification, the correction value may be a difference value. When the bitstream does not include a difference value for the current block, the decoder may determine that the difference value is (0,0). In this case, the decoder may compute the motion of the current block without the difference value, or the decoder may compute the motion of the current block by using (0,0) as the difference value. The difference value (0,0) implies motions in the (horizontal and vertical) directions, and the difference value may be signaled by the absolute value and sign value of each horizontal and vertical component.

In the above-described embodiments, whether to correct motion by using at least one among MVD, MMVD, TM, BM, optical flow-based TM, DMVR, and multi-pass DMVR is implicitly determined, whereas motion correction using MVD or MMVD is explicitly determined. Since the range of motion information that can be found varies depending the initial value of motion information, it is important to appropriately set the initial value of the motion information in order to increase the performance of motion correction. Accordingly, motion correction using MVD or MMVD may be explicitly performed, and motion correction using at least one among MVD, MMVD, TM, BM, optical flow-based TM, DMVR, and multi-pass DMVR may be implicitly performed. These embodiments will be described.

The bitstream may include a correction value for initial motion information signaled by the MVD. Furthermore, the correction method implicitly performed by the decoder may be carried out according to the following embodiments.

In a first embodiment of the present disclosure, the encoder may determine a motion correction method based on the encoding mode of a current block. In this case, the encoder may determine whether to use a difference value, based on the encoding mode of the block. Specifically, when the current block is encoded using a GPM mode, the encoder may correct motion information, which has been corrected by a difference value via MMVD, by using at least one among TM, BM, and optical flow-based TM. When the current block is encoded using an AMVP mode, the encoder may correct motion information by a difference value by using the MMVD method of Merge without using the MVD transmission method of AMVP. Subsequently, the encoder may correct the motion information, which has been corrected by the difference value, by using at least one among TM, BM, and optical flow-based TM.

In a second embodiment of the present disclosure, the encoder may determine a motion correction method based on the result of comparing motion information of a current block with information about a neighboring block adjacent to the current block. In this case, the encoder may determine whether to use a difference value, based on the result of comparing the motion information of the current block with the information about the neighboring block adjacent to the current block. In a specific embodiment, when the motion information of the current block and the information about the neighboring block adjacent to the current block have a certain level of similarity or more, the encoder may not use the difference value. Also, when the motion information of the current block and the information about the neighboring block adjacent to the current block do not have a certain level of similarity or more, the encoder may use the difference value. In this case, when the motion information of the current block and the information about neighboring blocks adjacent to the current block have a certain level of similarity or more, the encoder may not correct the motion information by using the difference value, but correct the motion information by using at least one among TM, BM, and optical flow-based TM. Furthermore, when the motion information of the current block and the information about the neighboring block adjacent to the current block do not have a certain level of similarity or more, the encoder may correct motion information corrected by a difference value via MMVD by using at least one among TM, BM, and optical flow-based TM.

In a third embodiment of the present disclosure, the encoder may determine a motion correction method based on at least one of the size of a current block, whether the current block is a luma block or a chroma block, quantization parameter information of the current block, and motion resolution information of the current block. In this case, the encoder may determine whether to use TM, based on the result of comparing motion information of the current block with information about a neighboring block adjacent to the current block. In a specific embodiment, the encoder may not apply TM to the current block when the size of the current block is greater than or equal to a predetermined size or when the motion resolution of the current block is a $\frac{1}{16}$-pixel unit. Furthermore, when the current block is a chroma block, the encoder may not apply TM to the current block, but may scale motion information corrected using TM in a luma block corresponding to the current block, and use the scaled motion information for the current block.

There are multiple methods for correcting motion information, and the processing step of selecting which motion correction method to use or determining the order of performing motion information correction may be applied in various other ways.

Figure 10:
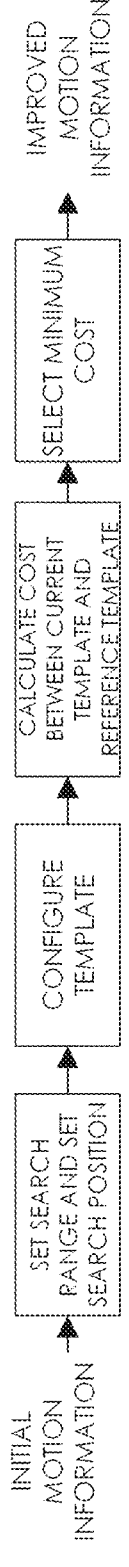
FIG. 10 illustrates a process in which TM is performed according to an embodiment of the present disclosure.

FIG. 10 illustrates a process in which TM is performed according to an embodiment of the present disclosure.

TM, BM, an optical flow-based TM method, and a multi-pass DMVR method have a trade-off between complexity and accuracy. TM has high complexity and cannot be parallelized, but has the highest performance. BM has high complexity and lower performance than TM, but can be parallelized. Optical flow has low complexity and can be parallelized, but has lower performance. Multi-pass DMVR has high complexity, but has high performance and can be parallelized. Thus, selection information about which method to apply depending on the characteristics of the current block may be signaled.

TM is a method by which a decoder performs, in order to reduce the size of a bitstream to be encoded, motion prediction without including motion information in the bitstream. In this case, the decoder may derive motion information of a current block by using a neighboring block that have already been reconstructed. TM may be performed according to FIG. 10. In a specific embodiment, an encoder and the decoder may establish a search range within a reference video based on initial motion information (an initial motion vector, or a reference index) derived from a neighboring block. The encoder and the decoder may select several candidate positions in the search range based on a predefined search pattern. The encoder and the decoder may generate a reference template for a current block by using a neighboring block of the current block, and may generate, based on the selected candidate positions, a reference video template having the same size as the template for the current block. The decoder may obtain a cost between the reference template for the current block and the reference video template. The cost may be acquired through Sum of Absolute Differences (SAD) or Mean-Removed SAD (MRSAD). After the decoder obtains the cost for all candidate positions within the search range, the decoder may determine a point having the minimum cost to be final motion information.

Figures 11, 12:
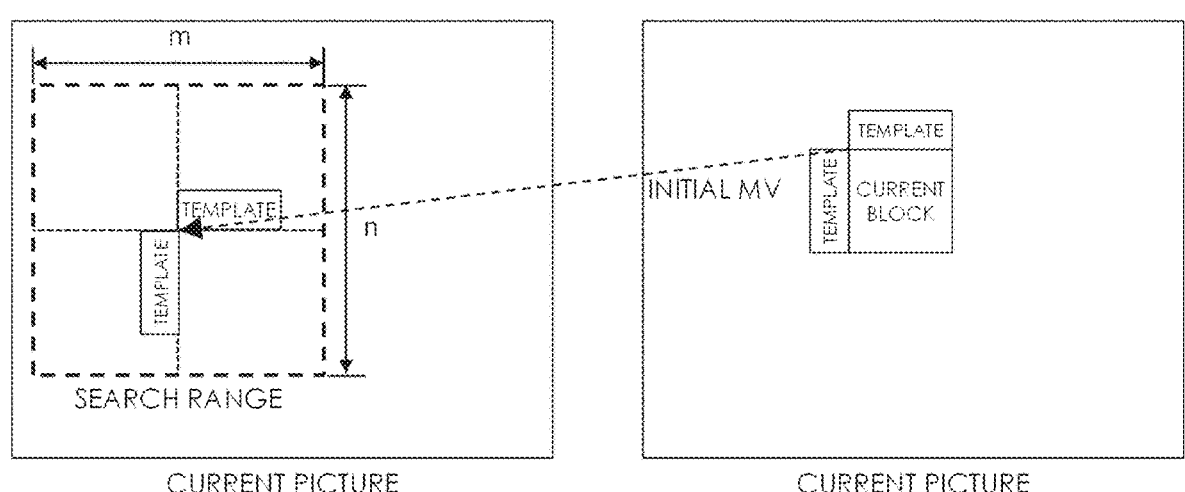
FIG. 11 illustrates setting a search range for template matching (TM) based on initial motion information according to an embodiment of the present disclosure.
FIG. 12 illustrates the position of a motion candidate to be searched for in TM according to an embodiment of the present disclosure.

FIG. 11 illustrates setting a search range for template matching (TM) based on initial motion information according to an embodiment of the present disclosure.

A decoder may set a block whose position has been moved by initial motion information (initial MV) relative to the top left position of a current block as a reference block corresponding to the current block. In this case, the decoder may set a search range of a predetermined size (m×n) relative to the top left position of the reference block. In an embodiment, the search range may be set to (−8 to +8) based on the position of the initial motion information, and the search range may be 16×16.

The decoder may acquire a left template and a top template by using a left block and a top block adjacent to the current block. The decoder may also acquire a left template and a top template based on the position of candidate motion information to be searched for in a reference picture.

FIG. 12 illustrates the position of a motion candidate to be searched for in TM according to an embodiment of the present disclosure.

In FIG. 12, the position of initial motion information is the center, and each mark shows the position of a motion candidate according to each search pattern. The search pattern may be a diamond pattern or a cross pattern. In FIG. 12, the position of ◇ shows the position of a motion candidate according to the diamond pattern. In addition, the position of + in FIG. 12 shows the position of a motion candidate according to the cross pattern. The interval between the positions of the motion candidates in each pattern may be determined based on at least one among: the size of a current block, whether the current block is a luma block or a chroma block, the resolution of current motion information, the POC difference between the current block and a reference block, and the motion characteristic of a neighboring block of the current block. Furthermore, the interval between the positions of the motion candidates may increase as the positions of the motion candidates are further away from the initial motion information. In another specific embodiment, the interval between the positions of the motion candidates may decrease as the positions of the motion candidates become further away from the initial motion information. In another specific embodiment, the interval between the positions of the motion candidates may be constant. In a specific embodiment, when the size of a first block is larger than the size of a second block, the interval between specific motion candidates when an encoder uses a specific pattern for the first block may be larger than the interval between the motion candidates when the pattern is used for the second block. This is because the larger the block size, the higher the probability that a large motion has occurred. Furthermore, when the size of the first block is smaller than the size of the second block, the interval between specific motion candidates when the encoder uses a specific pattern for the first block may be smaller than the interval between the motion candidates when the pattern is used for the second block. This is because the smaller the block size, the higher the probability that a small motion has occurred.

The encoder may include, in at least one of SPS, the PPS, a picture header, and a slice header, at least one of information indicating the interval between motion candidates and a search pattern. A decoder may acquire at least one of the interval between the motion candidates and the search pattern, based on at least one of the SPS, the PPS, the picture header, and the slice header.

Figure 13:
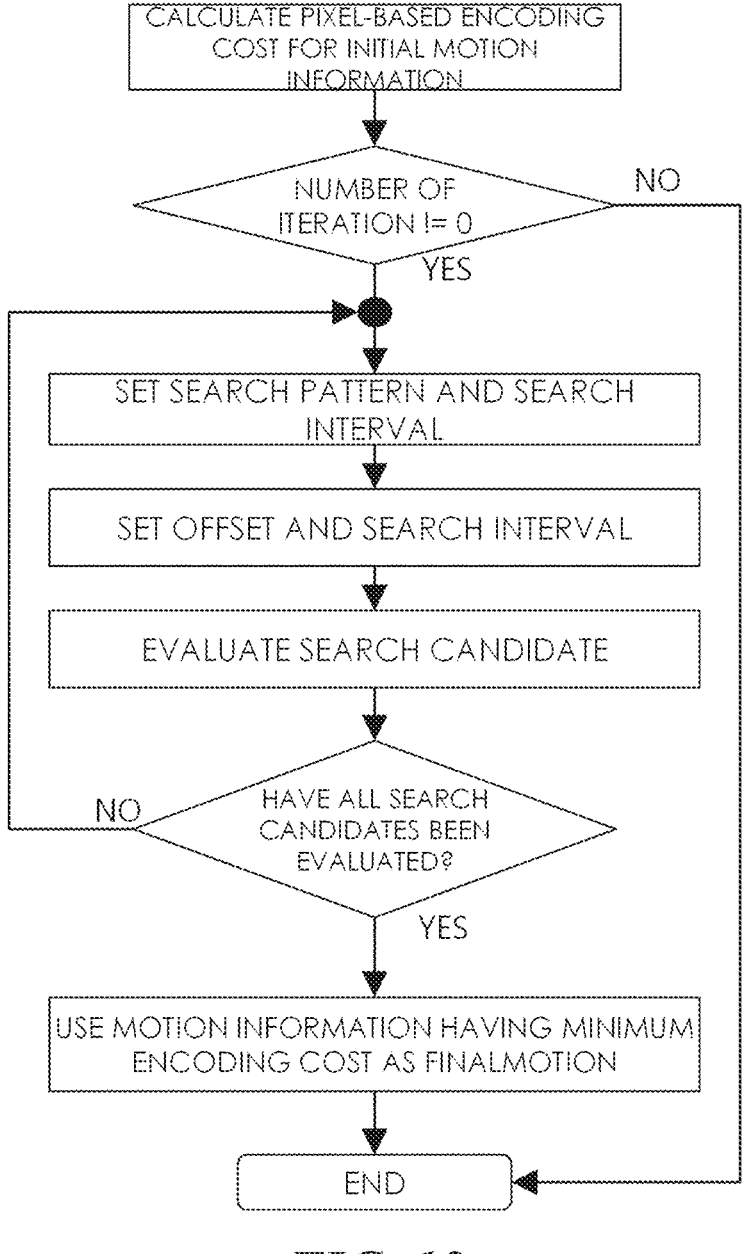
FIG. 13 illustrates the process of performing a search for a search candidate position according to an embodiment of the present disclosure.

FIG. 13 illustrates the process of performing a search for a search candidate position according to an embodiment of the present disclosure.

In the embodiment of FIG. 13, a decoder calculates a pixel-based cost of initial motion information from a current search candidate position. The decoder calculates the cost by changing the search candidate position by the number of iterations. In this case, the number of iterations, an initial search pattern, and an initial search interval may be predetermined. Furthermore, the number of iterations and the search interval may be determined based on the iteration pattern. For example, the number of iterations may be set to 375, the initial search pattern may be set as diamond, and the initial search interval may be set to 6.

When changing the search candidate position, the decoder resets the search pattern and the search interval. In this case, the search pattern and the search interval may be set based on at least one among whether a current block is a luma block or a chroma block, the resolution of current motion information, the number of iterations, and a cost distribution of previously acquired motion candidate positions. This will be described.

The decoder may set a search interval based on the resolution of motion information of the current block. The resolution of the motion information may be set to one of 1-integer pixel, 4-integer pixel, ½-integer pixel, ¼-integer pixel, and 1/16-integer pixel units. When the resolution of the motion information is a ¼ integer pixel, the initial search interval may be 6, and for other cases, the initial search interval may be set to 4.

The search pattern may be set to either a diamond pattern or a cross pattern. The search interval may increase from the initial search interval each time the number of searches increases. Specifically, the decoder may determine the search pattern and the search interval based on which iteration of search is currently being performed. For example, in the first search, the search pattern may be set to a diamond search pattern and the search interval may be set to the initial search interval. In the second search, the search pattern may be set to a cross pattern, and the search interval may be a value decreased by 1 from the initial search interval. In the third search, the search pattern is set to a cross pattern, and the search interval may be a value decreased by 1 from the search interval in the second search.

Alternatively, the decoder may set the search pattern and the search interval based on an iteration step. The iteration step may indicate how many times the search pattern and search interval are reset when the number of iterations is not 0. In other words, the search pattern and the search interval may vary depending on which iteration step. For example, in the first iteration step, the decoder may set the search pattern and search interval to a diamond search pattern and an initial search interval. In the second iteration step, the decoder may set the search pattern and the search interval to a cross pattern and a search interval decreased by 1 from the initial search interval. In a step after the second step, the decoder may set the search pattern and the search interval to a cross pattern and a search interval decreased by 1 from the previous step.

In another specific embodiment, the encoder and the decoder may determine a search candidate position based on cost. Specifically, the encoder and the decoder may move the search candidate position from the previous search candidate position to a position having the minimum cost. For example, when a candidate position having the minimum cost in the first search is a top left candidate position, the encoder and the decoder may perform the next search at a position adjacent to the top left candidate position. In this case, the encoder and the decoder may not proceed with a search at a bottom right candidate position. This allows the encoder and the decoder to reduce the complexity of the search.

In another specific embodiment, the size of a search interval used when a current block is a chroma block may be larger than the size of a search interval used when the current block is a luma block. This is because the degree of spatial correlation of a chroma signal is higher than the degree of spatial correlation of a luma signal.

In another specific embodiment, the size of a search interval used when a current block is a chroma block may be smaller than the size of a search interval used when the current block is a luma block. This may improve search performance.

In another specific embodiment, a search interval when the size of a current block is greater than a predetermined value may be greater than a search interval when the size of the current block is less than the predetermined value.

In another specific embodiment, a search interval when the size of a current block is greater than a predetermined value may be less than a search interval when the size of the current block is less than a predetermined value. Here, the predetermined size of the current block may be 16×16, 32×32, etc.

To correct the initial motion information, the encoder and the decoder may examine a predetermined pixel (pixel) position within a search range and use a motion candidate position having the minimum cost as final corrected motion information. In this case, the predetermined pixel positions may be search candidate positions. Specifically, the encoder and the decoder may set each search candidate position based on a search pattern, a search interval, and an initial motion information by using a predefined correction value (offset). The encoder and the decoder may calculate the search candidate position by summing an initial motion information and the correction value. Subsequently, the encoder and the decoder may acquire a cost of the search candidate.

The search candidate position may vary depending on the search pattern. For example, when a cross pattern is used, the correction value may be (0, 1), (1, 0), (0, –1), or (–1, 0). Furthermore, when a diamond search pattern is used, the correction value may be (0, 2), (1, 1), (2, 0), (1, –1), (0, –2), (–1, –1), (–2, 0), or (–1, 1). In a correction value (x, y), x represents a horizontal correction value and y represents a vertical correction value. The encoder and the decoder may sum the initial motion information and the above correction value to calculate the position of a search candidate. This search may be recursively performed by the number of iterations described above. After the decoder has acquired the cost of all search candidates, the decoder sets motion information having the lowest cost as final corrected motion information.

The decoder may differently perform the above-described search depending on whether a current block is a coding block or a sub-block. First, the case in which the current block is a coding block will be described.

When the current block is a coding block and when the current block is decoded in an AMVP mode, the search process may be performed for all motion candidates in motion candidate lists derived with respect to L0 and L1. The decoder may derive corrected motion information for each of L0 and L1. When the current block is a coding block and when a merge mode is used, a single motion candidate list may be derived for L0 and L1. The decoder may perform the above-described search for all motion candidates in the motion candidate list.

A reference direction indication information indicating whether the current block is an L0 unidirectional prediction, an L1 unidirectional prediction, or a bidirectional prediction may be reset based on a cost calculated during a search. Specifically, the decoder may reset the reference direction indication information based on the minimum value among the cost of a prediction block generated using initial motion information of L0, the cost of a prediction block generated using initial motion information of L1, the cost of a prediction block generated using a weighted average of initial motion information of L0 and L1, the cost of a prediction block generated using the corrected motion information of L0, the cost of a prediction block generated using corrected motion information of L1, and the cost of a prediction block generated using a weighted average of corrected motions of L0 and L1.

When the current coding block is divided into multiple sub-blocks, initial motion information of each sub-block may be reset to motion information corrected by the above-described search. In this case, the template may be different for each sub-block within the current block. Specifically, a pixel of a neighboring sub-block may be used as a template for a sub-block in the current block. The neighboring sub-block must be reconstructed before a search for the next sub-block may be performed, and thus parallel processing is not performed. Therefore, the decoder may perform the above-described search only for a sub-block positioned on the boundary of the current block. In another specific embodiment, the decoder may derive corrected motion information by using TM for a sub-block positioned on the boundary, and may derive motion information by using at least one of BM, optical flow-based TM, and multi-pass DMVR for a sub-block not positioned on the boundary.

Figure 14:
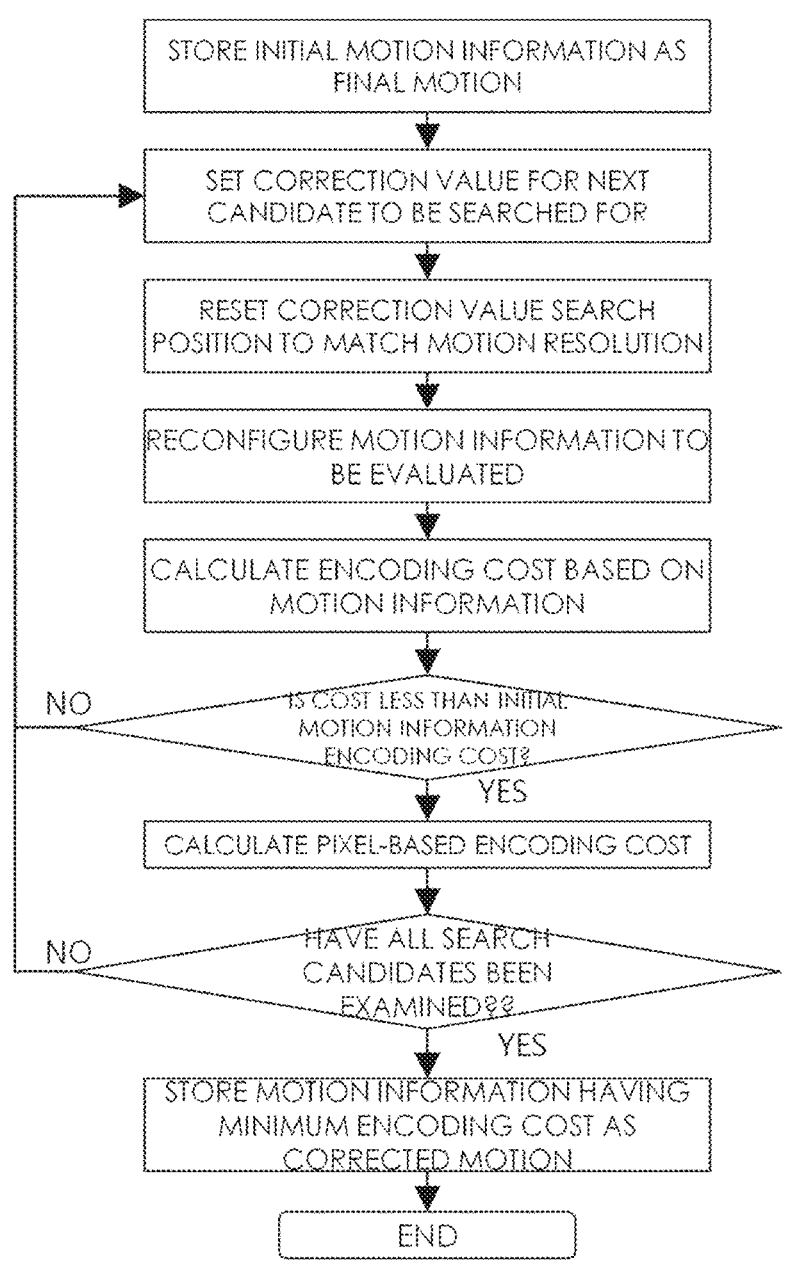
FIG. 14 illustrates a method for acquiring the cost of a search candidate by using a correction value for a search candidate position according to an embodiment of the present disclosure.

FIG. 14 illustrates a method for acquiring the cost of a search candidate by using a correction value for a search candidate position according to an embodiment of the present disclosure.

A decoder may store initial motion information as final motion information. The decoder may acquire the cost of correction values for all search candidates through the following process.

The decoder selects one from among correction values for candidate positions to be searched for. The correction value may be reset to match a motion resolution to be used in a current block. The decoder may set a value, obtained by adding the reset correction value to the initial motion information, as motion information to be evaluated. The decoder may calculate a cost based on the motion information. This is because the complexity increases when the decoder obtains, based on a pixel, the cost of the motion information to be evaluated. The decoder may calculate a motion information-based cost by multiplying each of the difference between the horizontal value of the initial motion information and the horizontal value of corrected motion information and the difference between the vertical value of the initial motion information and the vertical value of the corrected motion information by a predetermined weight. In this case, the predetermined weight may be 4. When the motion information-based cost is less than a pixel-based cost of the initial motion information, the decoder may calculate a pixel-based cost of regenerated motion information. The decoder may evaluate the correction values for all search candidates and then set motion information having the minimum cost as final motion information.

In the motion information-based cost calculation, the cost may be calculated using the difference value between the initial motion information and motion information obtained by adding the correction value to the initial motion information. Thus, the cost may vary depending on the size of the correction value. Since the cost decreases as the correction value becomes smaller, pixel-based cost evaluation may be performed only for motion information of a candidate position close to the initial motion information. To compensate for this, the decoder may acquire a pixel-based cost by using at least one among: the difference in motion information values between neighboring blocks, quantization parameters, and the size of the current block.

In a specific embodiment, the decoder may acquire a pixel-based cost by using a distribution of motion information of neighboring blocks. The decoder may acquire the cost based on a difference value between corrected motion information and motion information of the neighboring blocks. Specifically, when the difference between the corrected motion information and the motion information of the neighboring blocks is greater than a predetermined value, the decoder may acquire a pixel-based cost and perform candidate position evaluation based on the pixel-based cost.

In another specific embodiment, the decoder may set, based on the size of a block, the value of the weight used to calculate the motion information-based cost. Specifically, when the size of the current block is greater than a predetermined value, the decoder may set the weight to be smaller than a weight used when the size of the current block is less than the predetermined value. In another specific embodiment, the decoder may set the value of the weight to be smaller as the size of the current block increases. This is because the larger the block size, the more efficient it may be to evaluate a wider range of motion candidates. In another specific embodiment, when the size of a current block is greater than a predetermined value, the decoder may set the weight to be smaller than a weight used when the size of the current block is smaller than the predetermined value. In another specific embodiment, the decoder may set the value of the weight to be larger as the size of a current block increases. This may reduce decoding complexity. In the aforementioned embodiments, the size of the current block may be 16×16 or 32×32. Furthermore, the size of the current block may be set as the sum of the horizontal size and the vertical size. Furthermore, the weight may be an integer value. Specifically, the weight may be one selected from among 1, 2, 3, 4, 5, and 6.

Figure 15:
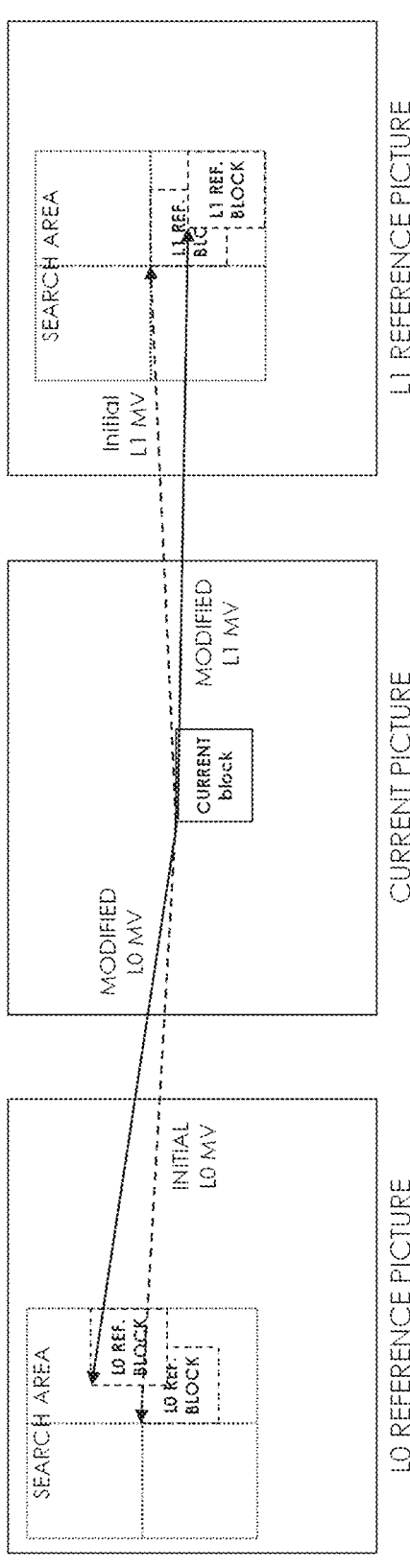
FIG. 15 illustrates that motion correction is performed using DMVR according to an embodiment of the present disclosure.

FIG. 15 illustrates that motion correction is performed using DMVR according to an embodiment of the present disclosure.

DMVR is a method that uses the bilateral matching (BM) technique to find corrected motion of a current block. BM is performed on a block that has bidirectional motion. Specifically, in BM, an encoder and a decoder find the most similar part in a search range around an L0 reference block and a search range around an L1 reference block, and acquire corrected bidirectional motion information based on the found part. The search range around each of the reference blocks has a predetermined size of (m×n), based on the top left position of the reference block. Specifically, the decoder may set the search range to (−8 to +8), based on a position indicated by initial motion information from the top left position of the reference block. In this case, the size of the search range is 16×16. In another specific embodiment, the decoder may set the search range to (−8 to +8) based on a position indicated by the initial motion information from the center position of the reference block. In this case, the size of the search range is 16×16. The above-described most similar part may be the point where when the per-pixel cost between the blocks is calculated, the cost is minimized. The cost may be acquired through Sum of Absolute Differences (SAD) or Mean-Removed SAD (MRSAD). Furthermore, the encoder may include, in a bitstream, information indicating a cost calculation method. Specifically, the encoder may include information indicating the cost calculation method in at least one among SPS, PPS, a picture header, and a slice header. The decoder may acquire the information indicating the cost calculation method and determine the cost calculation method, based on the acquired information.

Motion information of a divided small block may be more precise than motion information of a large block. Therefore, the decoder may divide a current block into multiple sub-blocks and perform DMVR on each of the divided sub-blocks. In this case, the decoder may not perform DMVR on the entire current block, but only on the divided sub-blocks. In another specific embodiment, the decoder may apply corrected motion information acquired by using DMVR on the entire current block to DMVR on the divided sub-blocks. In the divided sub-blocks, motion information may be recorrected by performing sub-block-wise DMVR using the corrected motion information acquired using DMVR on the entire current block. This may be referred to as multi-stage DMVR.

Figure 16:
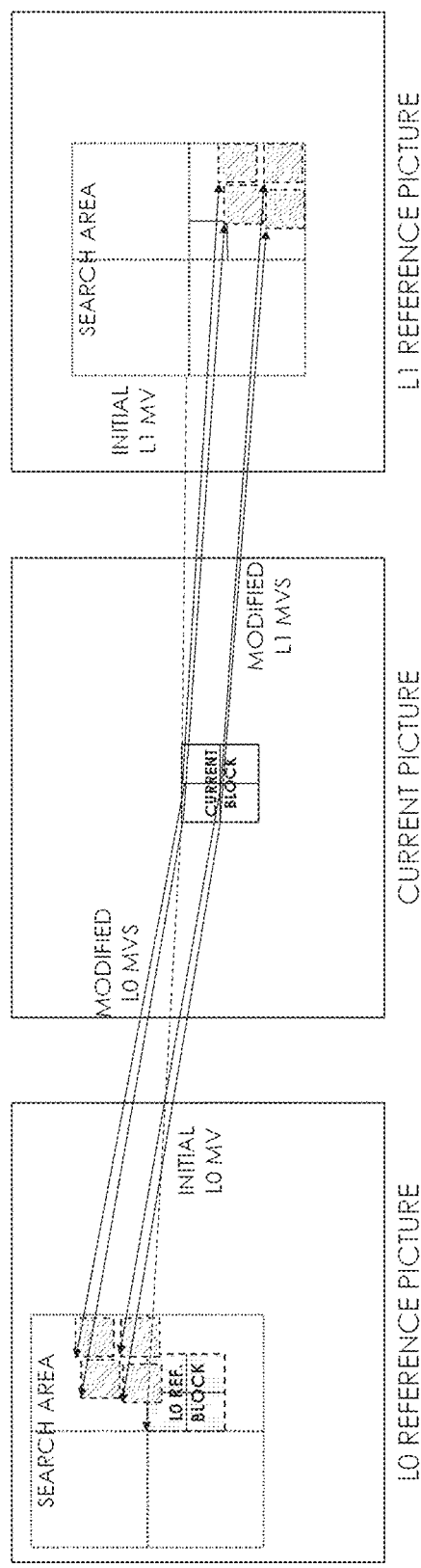
FIG. 16 illustrates a method by which a decoder divides one block into multiple sub-blocks and then performs DMVR on each divided small sub-block according to an embodiment of the present disclosure.

FIG. 16 illustrates a method by which a decoder divides one block into multiple sub-blocks and then performs DMVR on each divided small sub-block according to an embodiment of the present disclosure.

In the embodiment of FIG. 16, a 3×3 square search technique is used to obtain corrected motion information and a pixel-based cost of the corrected motion information. In multi-stage DMVR, a decoder may first find corrected motion information while changing a resolution unit. Specifically, the decoder may find corrected motion information by setting the motion information resolution to an integer unit, and the decoder may acquire corrected motion information by setting the motion information resolution to a half-pixel (½) unit. When template matching is applied to a current block, the decoder may perform the template matching by using the acquired corrected motion information.

When, as a result of performing the template matching, the corrected motion information of a current coding block has changed from bidirectional to unidirectional, the DMVR process cannot be performed, and thus the subsequent DMVR process is terminated. In this case, the direction of the motion information of the current block is finally determined to be unidirectional. If, as a result of performing the template matching, the corrected motion information of the current coding block is bidirectional, the DMVR process is performed.

Figure 17:
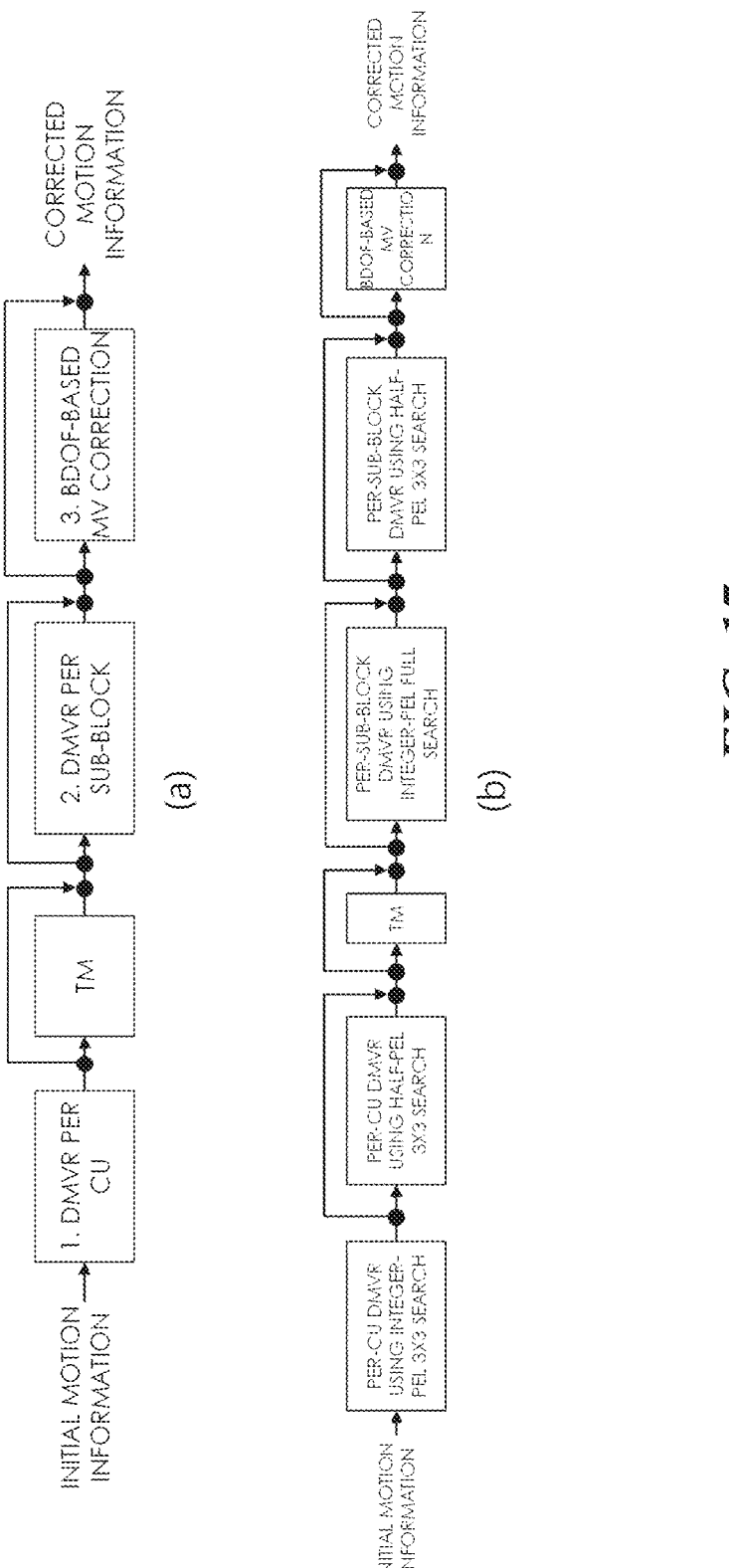
FIG. 17 illustrates that DMVR is performed on a sub-block basis according to an embodiment of the present disclosure.

FIG. 17 illustrates that DMVR is performed on a sub-block basis according to an embodiment of the present disclosure.

In sub-block-wise DMVR, a decoder may divide a current block into multiple sub-blocks, and perform motion correction for each sub-block. In this case, the size of the sub-block may be up to 16×16. Specifically, the decoder may perform a full search on an integer pixel basis and a 3×3 square pattern search on a half-pixel basis. Here, the full search is the process of finding a position, in which the cost is minimized, among all pixel positions in a predetermined search range (m×n).

Figure 18:
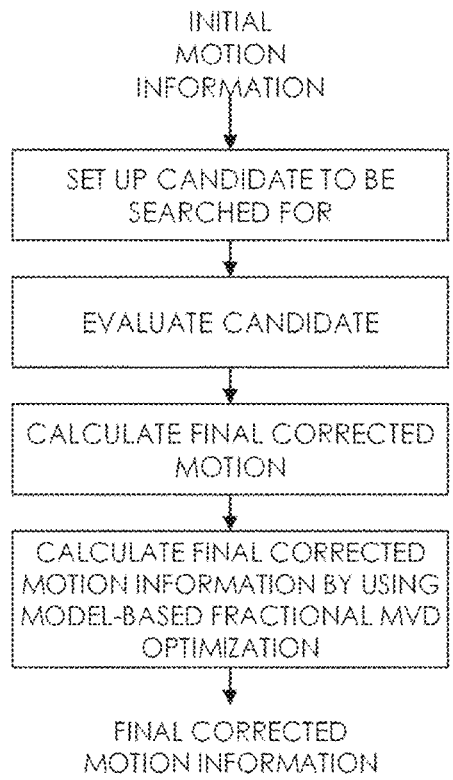
FIG. 18 illustrates a 3×3 square pattern search process being performed according to an embodiment of the present disclosure.

FIG. 18 illustrates a 3×3 square pattern search process being performed according to an embodiment of the present disclosure.

A decoder may set a candidate for search by using input initial motion information, and then evaluate motion information at a candidate position to calculate final corrected motion information. The decoder may determine whether to perform a model-based fractional MVD optimization based on the resolution of motion information of a current block. The decoder may recalculate the final corrected motion information by using the model-based fractional MVD optimization technique. In addition, the integer-wise full search may be performed similarly to the 3×3 square pattern search.

Figure 19:
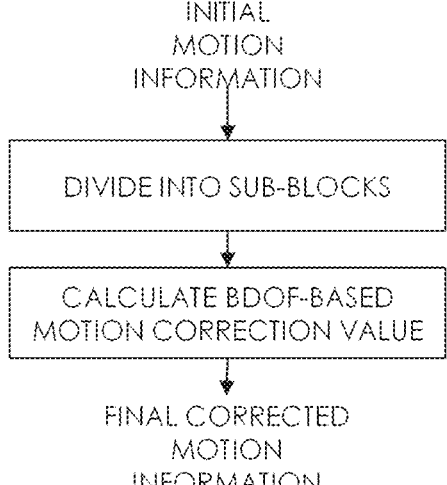
FIG. 19 illustrates bi-directional optical flow (BDOF)-based motion correction according to an embodiment of the present disclosure.

FIG. 19 illustrates bidirectional optical flow (BDOF)-based motion correction according to an embodiment of the present disclosure.

A decoder may divide a current block into sub-blocks, and then correct input initial motion information by using BDOF to acquire final corrected motion information. In the BDOF of VVC, the decoder estimates the amount of pixel change from a reference block of a block generated by bidirectional motion, and correct a prediction block based on the estimated amount of pixel change. In the BDOF of VVC, the decoder may correct motion of the current block by using derived motion information. If the current block is encoded in at least one of the following modes: affine, LIC, OBMC, sub-block MC, CIIP, SMVD, BCW having different weights, and MMVD, the decoder may not perform BDOF-based motion correction. Furthermore, the decoder may perform BDOF-based motion correction if the current block satisfies at least one of the cases in which: 1) motion in Merge mode is bidirectional; 2) the distances between reference pictures and a current picture are the same; 3) a weight prediction between the reference blocks is not applied to the block; and 4) the size of the current block is equal to or larger than a predetermined size. The predetermined size may be "8" in width and/or "8" in length. Furthermore, when the decoder performs BDOF-based motion correction, the decoder may divide the current block into sub-blocks, and perform the BDOF-based motion correction for each sub-block. The size of the sub-blocks may be up to 16×16.

Through this embodiment, the prediction efficiency of the motion information of the current block may be increased. Thus, a bit amount for a motion difference value signaled by a bitstream may be reduced.

Also, as the prediction efficiency of the motion information increases, there may be many cases where the difference value of the motion information is "0,0". In such cases, the encoder may select a merge mode as a final encoding mode for the current block. In the merge mode, a single motion candidate list is used, and thus L0 and L1 are processed in a single list. In an AMVP mode, motion candidate lists of L0 and L1 are processed independently of each other. Therefore, the TM performance of AMVP may be higher than the TM performance of the merge mode. That is, the encoder may also select the AMVP mode in which the difference value of the motion information is "0,0". In this case, the encoder may or may not additionally include the difference values of the motion information in the bitstream. The encoder may signal, in the bitstream, whether to additionally transmit the difference value. The decoder may parse whether to additionally transmit the difference value to determine whether there is a difference value for the current block. If there is a difference value for the current block, the decoder may additionally parse the difference value. The decoder may calculate the motion of the current block by summing the difference value and motion prediction value and of the current block. If there is no difference value of the current block, the decoder may not parse the difference value of the current block. In this case, the difference value may be inferred to be (0,0). That is, the motion of the current block may be calculated without the difference value, or the decoder may use the difference value of (0,0) to calculate the motion of the current block. Here, the difference value (0,0) implies motion in the (horizontal and vertical) directions, respectively, and the difference value may be generated as the absolute values and sign values of horizontal and vertical components, and may be signaled and parsed.

When the AMVP mode in which the difference values of the motion information are small or "0,0" frequently occur, the encoder may signal the difference values of the motion information in the horizontal and vertical directions together instead of separately signaling the difference values. Specifically, the encoder may signal the difference values (0,0) in the horizontal and vertical directions by using single flag information. When the encoder encodes difference values of the motion information, the encoder may signal the horizontal and vertical directions separately by using respective codewords. In another specific embodiment, when the encoder encodes the difference values of the motion information, the encoder may integrate the horizontal and vertical directions into a single codeword for signaling. In another specific embodiment, when the difference values are equal to or less than a predetermined difference value, the decoder may integrate the horizontal and vertical directions into a single codeword for signaling. Furthermore, when the difference values are greater than the predetermined difference value, the decoder may signal the horizontal and vertical directions separately by using respective codewords. The predetermined difference value may be an integer.

FIG. 20 illustrates parsing information signaling the presence or absence of a difference value when the presence or absence of the difference value is signaled according to an embodiment of the present disclosure.

First, a decoder may parse mvd_zero_flag, which signals whether a difference value of motion information is 0,0. When the mvd_zero_flag indicates that the difference value of the motion information is 0,0, the decoder may omit the subsequent process. When the mvd_zero_flag has a value of 1, the mvd_zero_flag may indicate that the difference value of the motion information is 0,0.

When the mvd_zero_flag indicates that the difference value of the motion information is not 0,0, the decoder may parse abs_mvd_greater0_flag[0] indicating whether the horizontal direction is 0. When the abs_mvd_greater0_flag [0] is 0, the abs_mvd_greater0_flag[0] may indicate that motion in the horizontal direction is 0. Also, when the abs_mvd_greater0_flag[0] indicates whether the horizontal motion is 0, the decoder may not parse abs_mvd_greater0_flag[1]. In this case, the decoder may determine that the value of the abs_mvd_greater0_flag[1] is 1. This is because the difference value of the motion information is not 0,0, so when the horizontal motion is 0, the vertical motion must be greater than or equal to 1. When the abs_mvd_greater0_flag[0] indicates that the horizontal motion is not 0, the decoder may parse the abs_mvd_greater0_flag[1] indicating whether the vertical motion is 0. This is because the horizontal motion is not 0, so it is not possible to determine whether the vertical motion has a value of 0.

Information signaling whether the difference value is 0 may be signaled in SPS, PPS, and a picture header. In this case, sps_mvd_zero_enabled_flag in the SPS, pps_mvd_zero_flag in the PPS, and ph_mvd_zero_enabled_flag in the picture header may signal whether the information signaling whether the difference is 0 is signaled.

In a merge mode, when an encoder codes the motion difference value by using an MMVD method, the encoder may signal indexes of a table in which the indexes are mapped to predefined distances, and direction information corresponding to either horizontal or vertical.

When the encoder uses a template matching method, the distribution of motion difference values may be more concentrated at 0 than when the template matching method is not used. Therefore, the encoder may combine distance information with direction information to generate a table. In this case, the encoder may generate the table such that each index indicates a direction together with the distance information. In another specific embodiment, the encoder may generate a table that separately includes an index that indicates distance information and an index that indicates direction information. In another specific embodiment, information indicated by an index included in a table may be determined based on the number of difference values that require signaling. For example, when the number of difference values requiring signaling is equal to or less than the number of predetermined difference values, the encoder may generate a table such that each index indicates a direction together with distance information. When the number of predetermined differential values is greater than the number of predetermined differential values, the encoder may generate a table that separately includes an index indicating distance information and an index indicating direction information. The predetermined values may be integers.

When an AMVP mode is used, the motion accuracy is higher than when the merge mode is used because a motion difference value is included in a bitstream. On the other hand, the merge mode is advantageous in that it is possible to reduce a signaling overhead in a random identical motion area because only information about the identity with the previous motion needs to be included in a bitstream. When the AMVP mode is used, the encoder transmits a motion difference value to the decoder, thus resulting in a significant bit amount for the motion difference value. To accurately represent motion, more information is required and must be included in a bitstream, thus inevitably increasing the total amount of encoded bits. To address this increase in the bit amount, the motion correction method presented in the present disclosure may be used to derive a more accurate motion prediction value. In addition, the motion correction method presented in the present disclosure may reduce the bit amount for motion difference value information that is signaled.

FIG. 21 illustrates the operation of an encoder and the operation of a decoder when adaptive motion vector resolution (AMVR) and motion correction are used in combination according to an embodiment of the present disclosure. Specifically, FIG. 21A illustrates the operation of the encoder and FIG. 21B illustrates the operation of the decoder.

To further reduce the bit amount for the motion difference value, the encoder and the decoder may use an AMVR method and a motion correction method. AMVR is a method for adaptively setting the resolution of motion information on a block-by-block basis, wherein the motion information may be signaled in one among a ¼-pixel unit, a ½-pixel unit, a 1-integer pixel unit, or a 4-integer pixel unit for each block. Furthermore, information about whether to selectively apply the motion vector resolution on a block-by-block basis may be signaled by amvr_flag. The motion vector resolution applied to a current block may be signaled by amvr_precision_idx. If the current block is in an affine mode, the encoder may signal motion information in one among a ¼-pixel unit, a ¹⁄₁₆-pixel unit, or a 1-integer pixel unit for each block. If the current block is in an IBC mode, the encoder may signal motion information in one among a 1-integer pixel unit, and a 4-integer pixel unit for each block. When the AMVR method is applied, the motion resolution of a motion difference value varies depending on the motion resolution. The motion accuracy in the ¼-pixel units is higher than the motion accuracy in the ½-pixel unit, but a bit amount for a motion difference value in the ½-pixel unit is less than a bit amount for a motion difference value in the ¼-pixel unit. Therefore, there is a trade-off relationship between the bit amount and the motion accuracy for each block, and information about which motion resolution is to be applied for each block may be signaled. In this case, to improve the motion accuracy in the ½-pixel unit, the motion correction method presented in the present disclosure may be used in combination with AMVR.

Whether AMVR is applied and whether the motion correction method is applied may be varied and used in various ways, as follows.

The encoder may use at least one among the size of the current block, the horizontal or vertical size ratio of the current block, whether the current block is a luma block or a chroma block, and information about an encoding mode of the current block to determine whether to apply a motion correction application method on a block-by-block basis. In another specific embodiment, the encoder may include, in a bitstream, information indicating whether to apply the motion correction method on a block-by-block basis. The decoder may parse the information indicating whether to apply the motion correction method to determine whether to apply the motion correction method to the current block.

In another specific embodiment, the encoder may determine whether to apply the motion correction method to the current block, based on whether AMVR has been applied to the current block or whether AMVR has been applied and the motion resolution of the AMVR is set to a predetermined resolution. The predetermined resolution may be one of 1/16, 1/4, 1/2, 1, or 4. When AMVR has been applied to the current block and when the motion resolution is 1/2 pixel, the encoder may apply the motion correction method to the current block. When AMVR has been applied to the current block, the encoder may not signal information related to whether to apply the motion correction method, and the decoder may not parse whether to apply the motion correction method. Since AMVR is applied to the current block, the decoder may perform motion correction to improve the accuracy of the motion.

In another specific embodiment, the encoder may determine whether to apply AMVR to the current block, based on whether the motion correction method has been applied to the current block. When the motion correction method has been applied to the current block, the encoder may apply AMVR to the current block. Furthermore, when the motion correction method has been applied to the current block, the decoder may parse motion resolution information of the current block. In other words, whether to parse the motion resolution information may depend on whether the motion correction method is applied to the current block. Since AMVR is applied to the current block, the motion correction may be performed to improve the accuracy of the motion.

To reduce a bit amount for a motion difference value, the encoder may reduce the bit amount for the motion difference value by changing the pixel unit of the motion difference value using AMVR, as illustrated in FIG. 21A. The effect of changing the pixel unit on image quality may be improved by the motion correction method presented in the present disclosure.

The encoder may determine whether to apply AMVR to the current block, according to the following embodiments. The encoder may determine whether to apply AMVR to the current block in consideration of the cost of rate-distortion, which is the relationship between bit amount and image quality when AMVR is applied to the current block versus when AMVR is not applied to the current block. In another specific embodiment, the encoder may determine whether to apply AMVR to the current block by using at least one among the size of the current block, the ratio of the horizontal or vertical size of the current block, the encoding mode of the current block, and whether the horizontal or vertical component of a difference value of the current block is equal to "0". Specifically, when the size of the current block is smaller than a predetermined size, the AMVR may be applied to the current block. In another specific embodiment, when the horizontal component of the difference value of the current block is equal to 0, the encoder may apply the AMVR to the current block. In another specific embodiment, when the horizontal component of the difference value of the current block is not equal to 0, the encoder may apply the AMVR to the current block. Whether to apply the AMVR is determined based on a specific condition, the decoder may not parse information about whether to apply the AMVR to the current block.

Whether to perform an AMVR transform process depends on whether or not AMVR is applied to the current block. When AMVR is applied to the current block, the encoder may perform the AMVR transform process. In the AMVR transform process, the encoder changes the pixel unit of a motion difference value. Therefore, the encoder changes the motion difference value to a pixel unit higher than the existing pixel unit. For example, when the existing pixel unit is 1/4, the encoder may change the pixel unit to 1/2, 1, or 4. The motion difference value in the pixel unit higher than the existing pixel unit may be a value obtained by removing difference information for a random unit from the motion difference value in the existing pixel unit. Furthermore, the motion difference value in the pixel unit higher than the existing pixel unit may be in a decimal unit or a random integer unit. Furthermore, information about a pixel unit to which the motion value has been changed may be signaled on a block-by-block basis and included in a bitstream. This may be performed during an entropy coding process.

During the encoding process, the current block may be used as a reference block for the next block to be encoded. Thus, the currently encoded block may be reconstructed for the next block to be encoded. This should be the same as the reconstruction process of the decoder. When the reconstruction processes of the encoder and the decoder are not the same, video mismatch may occur, and the quality of a video reconstructed by the decoder may become progressively worse. Therefore, the reconstruction by the encoder should be performed in the same manner as the reconstruction process of the decoder.

As illustrated in FIG. 21B, after parsing the difference value from the bitstream, the decoder may determine whether to perform AMVR inversion and motion correction based on whether AMVR is applied to the current block. The decoder may determine whether to perform AMVR inverse transformation based on whether AMVR is applied in the current block. The decoder may determine whether to perform motion correction based on at least one among whether AMVR is applied to the current block, the size of the current block, a horizontal or vertical size ratio of the current block, an encoding mode of the current block, and whether the horizontal or vertical component of a difference value of the current block is equal to 0. Specifically, when AMVR is applied to the current block, the decoder may perform AMVR inverse transformation and motion correction. When AMVR is applied, the decoder may inversely transform the difference value parsed from the bitstream to an existing pixel unit. When the pixel unit of the difference value is a 1/2-pixel unit and when the existing pixel unit is 1/4, the decoder may change the pixel unit of the difference value to the existing pixel unit by multiplying the current difference value by 2. The decoder may add the changed motion difference value of the current block to a current block motion prediction value to generate motion information of the current block. The generated motion information of the current block may not be an optimal motion because AMVR has been applied. Therefore, the motion correction method presented in the present disclosure may be additionally performed to correct the motion information of the current block.

When the decoder uses the AMVR method for the motion difference value, information about the motion difference value within a random unit is removed based on pixel units to be changed due to AMVR. Therefore, the removed motion information may be corrected by the motion correction method. This will be described with reference to FIG. 22.

Figure 22:
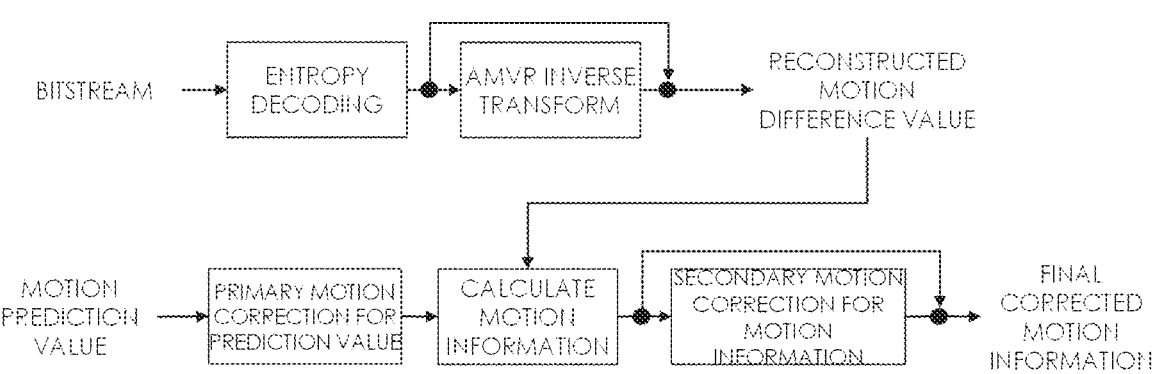
FIG. 22 illustrates a secondary correction being applied to reconstructed motion information according to an embodiment of the present disclosure.

FIG. 22 illustrates a secondary correction being applied to reconstructed motion information according to an embodiment of the present disclosure.

The motion correction method may be primarily used to more accurately calculate a prediction value of motion information. A decoder calculates motion information of a current block by summing a corrected motion prediction value and a motion difference value. Subsequently, the decoder may apply a secondary motion correction method to the motion information of the current block to acquire final corrected motion information. The decoder may determine whether to perform the secondary motion correction process, based on at least one among the size of the current block, a horizontal or vertical size ratio of the current block, the encoding mode of the current block, and whether the horizontal or vertical component of a difference value of the current block is equal to 0.

The search range when performing the motion correction may vary depending on an AMVR pixel unit or the motion resolution of the current block. In a specific embodiment, when the pixel unit of AMVR is a 1-integer unit, the search range may be a predetermined (m, n) in order to correct motion information in a ¼-pixel unit. For example, the search range may be (16, 16).

In another specific embodiment, when the pixel unit of AMVR is a ½-pixel unit, the search range may be a predetermined (m, n) in order to correct motion information in the ½-pixel unit. For example, the search range may be (8, 8).

In another specific embodiment, when a current coding block is divided into multiple sub-blocks, the decoder may correct motion information by applying an AMVR pixel unit of the current coding block to each sub-block. Alternatively, the decoder may correct motion information by setting different AMVR pixel unit for each sub-block. In this case, an AMVR pixel unit difference value for each sub-block may be included in a bitstream. The decoder may sum the AMVR pixel unit of the coding block and the AMVR pixel unit difference value of a sub-block to set AMVR pixel unit of the current sub-block.

Figure 23:
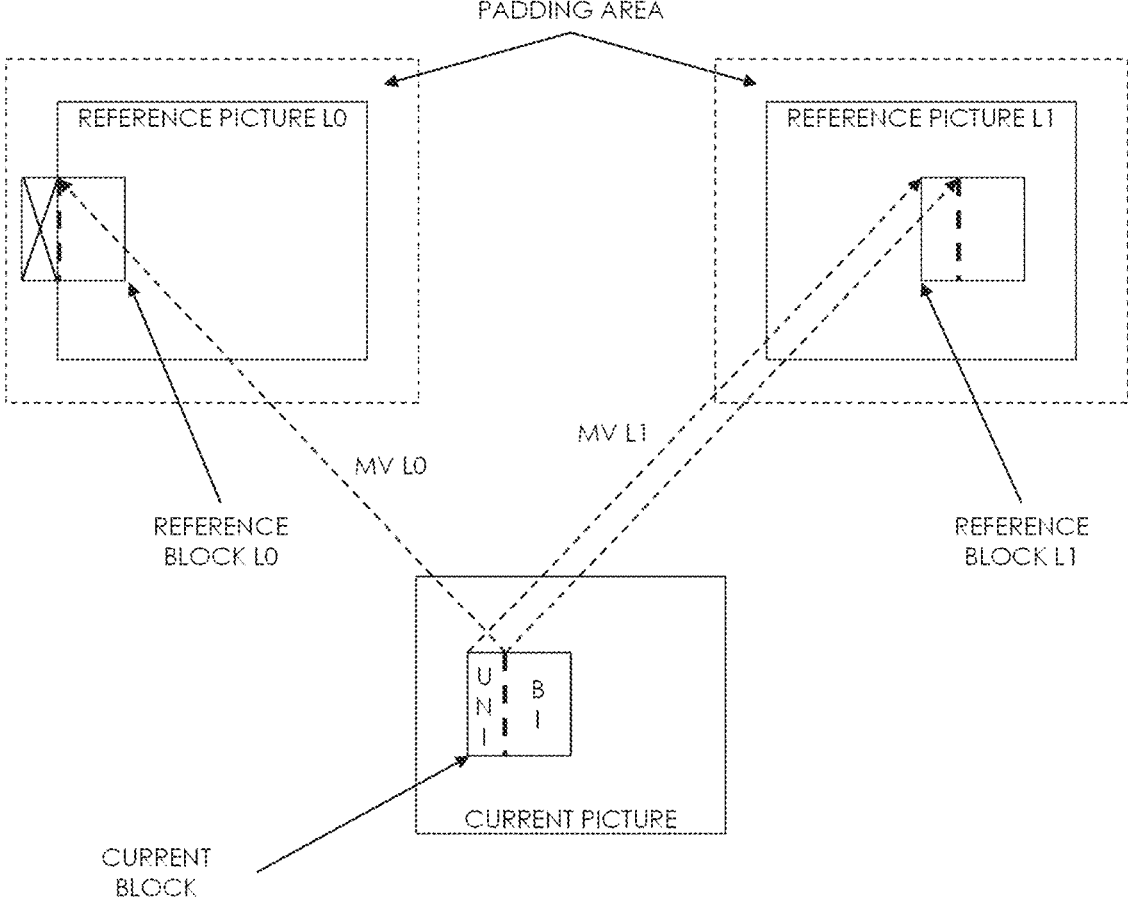
FIG. 23 illustrates a method for performing bidirectional prediction on a current block according to an embodiment of the present disclosure.

FIG. 23 illustrates a method for performing bidirectional prediction on a current block according to an embodiment of the present disclosure.

A decoder may obtain an L0 prediction block from reference picture L0 via L0 motion information (MV L0), obtain an L1 prediction block from reference picture L1 via L1 motion information (MV L1), and generate a prediction block for a current block by weight-averaging the two prediction blocks. If motion information is outside a picture boundary, the decoder may use a random padding area outside the picture boundary to generate a prediction block. The padding area may be generated by copying a pixel closest to the picture boundary. Since the padding area is equally filled with picture boundary pixels, the accuracy of a prediction block using the padding area may be low. An encoder may compare bidirectional prediction using the padding area with unidirectional prediction using only the L1 motion information without using the padding area, and select the prediction that is more efficient from a rate-distortion perspective. In this case, there may be a situation in which unidirectional prediction is chosen due to the low accuracy of the padding area. In this situation, to improve the encoding efficiency, a prediction block may be generated by excluding a part of the padding area.

In a specific embodiment, as illustrated in FIG. 23, the entire prediction block obtained via the L1 motion information is inside the picture, so the decoder may use all pixels in the block as the prediction block. On the other hand, in the case of the prediction block obtained via the L0 motion information, a part of the block includes the padding area. Therefore, the decoder may use only the remaining part of the block, excluding the padding area, for prediction. The decoder may use both the unidirectional prediction and the bidirectional prediction to generate a prediction block for the current block. This block is referred to as an out-of-boundary (OOB) block. That is, the decoder may determine, based on motion information, whether the prediction block for the current block references the padding area (or whether the prediction block is outside the picture boundary). Furthermore, the decoder may determine an available prediction block area and an unavailable prediction block area, based on the motion information and whether the prediction block references the padding area (or whether the prediction block is outside the picture boundary). The decoder may determine areas for unidirectional prediction and bidirectional prediction, based on the available prediction block area and the unavailable prediction block area.

In FIG. 23, a part of the current block is an area where unidirectional prediction has been performed and the rest of the current block is an area where bidirectional prediction has been performed. Among the previously described motion correction methods, TM may be used for both unidirectional prediction and bidirectional prediction, while DMVR (or multi-pass DMVR) may be used only for bidirectional prediction. When DMVR is applied to the bidirectional prediction area of the current block, the bidirectional prediction block may change. In this case, blocking artifacts may occur at the boundary between the unidirectional prediction area and the bidirectional prediction area. Various methods may be applied to remove the blocking artifacts, such as the following. This will be described with reference to FIG. 24.

Figure 24:
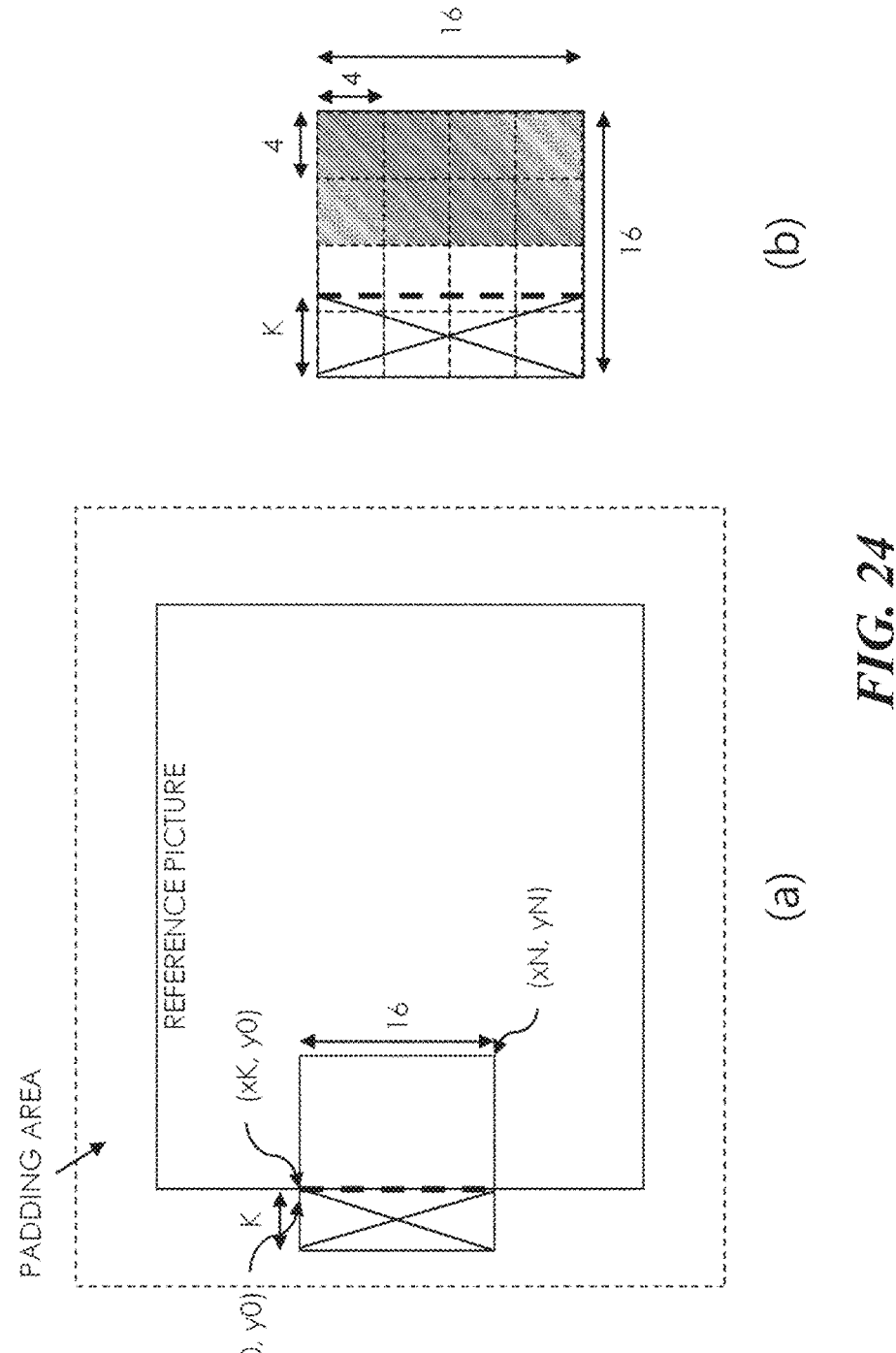
FIG. 24 illustrates a method by which a decoder according to an embodiment of the present disclosure applies a deblocking filter to an OOB block.

FIG. 24 illustrates a method by which a decoder according to an embodiment of the present disclosure applies a deblocking filter to an OOB block.

The decoder may determine the boundary between a unidirectional prediction area and a bidirectional prediction area, and apply a deblocking filter to the determined boundary. In a specific embodiment, the decoder may determine the boundary between the unidirectional prediction area and the bidirectional prediction area by using at least one among motion information of a current block, whether a prediction block is outside a picture boundary, an available prediction block area, and whether the current block is in a mode in which both unidirectional prediction and bidirectional prediction are used. In this case, the decoder may apply a deblocking filter to the boundary. In an embodiment, as illustrated in FIG. 24A, a prediction block may have a size of 16×16, the area of the L0 prediction block may be an area (N=15) from (x0, y0) to (xN, yN), and an available prediction block area in the L0 prediction block may be from (xK, y0) to (xN, yN). In this case, a vertical boundary (xK, yZ, Z=0 to 15) is the boundary between the unidirectional prediction area and the bidirectional prediction area, so the decoder may apply a deblocking filter to the boundary. Here, K is the number of pixels in the prediction block that are outside a picture area. Deblocking filtering may be applied to a block boundary and a boundary having x-axis coordinates or y-axis coordinates which are multiples of 4. The decoder determines whether the boundary between the unidirectional prediction area and the bidirectional prediction area matches the existing deblocking filtering boundary, and if the boundaries match, the decoder may perform the existing deblocking filtering process without any changes.

When the boundaries do not match, the decoder may define a new boundary and apply the deblocking filter to the new boundary. In this case, the length and strength of the deblocking filtering may be set to predetermined values. The predetermined values may be positive integers. For example, the size of the deblocking filter may be set based on the size of the unidirectional and bidirectional prediction areas, and the strength of the deblocking filtering may be 1.

In another specific embodiment, the decoder may adjust the area of the available prediction block in a random pixel unit or sub-block unit. Here, the random pixel unit may be an integer of 1 or greater. Specifically, the pixel unit may be selected from at least one of 1, 2, 4, and 8. Furthermore, the sub-block unit may be an integer of 2 or greater. For example, the size of a sub-block may be selected from one of $2\times2$ and $4\times4$. The decoder may adjust the area of the available prediction block in a 4-pixel unit such that the boundary between the unidirectional prediction area and the bidirectional prediction area matches a multiple of 4. Thus, the decoder may use the existing deblocking filtering process without any changes. Specifically, the decoder may adjust the area of the available prediction block in a 4-pixel unit such that the boundary between the unidirectional prediction area and the bidirectional prediction area matches a multiple of 4. For example, as illustrated in FIG. 24B, the decoder may adjust the area of available prediction block based on a value of K, which is the number of pixels in the prediction block that are outside the picture area. That is, the decoder may use a multiple of 4 greater than the value of K as the starting point of the area of the available prediction block. The shaded area in FIG. 24B is the available prediction block area. In accordance with the above-described embodiments, the decoder may reset current encoding information and motion information such that the boundary between the unidirectional prediction area and the bidirectional prediction area is determined to be the boundary of the prediction block. Thus, the decoder may apply the existing deblocking filtering process without any changes. That is, the decoder may change the encoding mode of the current block to a sub-block mode and change motion information in the unidirectional prediction area from bidirectional prediction motion information to unidirectional prediction motion information. If at least one of the motion information correction methods such as TM, BM, and DMVR is applied to the current block, the decoder may correct motion information. In this case, when the decoder determines a filtering strength in deblocking filtering, the decoder may use the corrected motion information. That is, the decoder may determine the filtering strength of a deblocking filter based on the corrected motion information. In another specific embodiment, when the decoder determines a filtering strength in the deblocking filtering, the decoder may use motion information before the DMVR method is applied.

When the decoder applies the deblocking filter, the conditions for deriving boundary strength (bS) may include whether the current block is predicted by inter prediction and whether unidirectional prediction and bidirectional prediction occurred simultaneously in distinct areas within a coding block. When the conditions are satisfied, the decoder may assign predetermined values to the bS of boundaries of Y, U, and V to a preset value. The predetermined values may be 1, 1, and 1 for Y, U, and V, respectively. In another specific embodiment, the decoder may set the bS of a chroma signal to "0". This is because the gradient representing changes in the chroma signal is gradual. In these embodiments, a bS value of 2 indicates strong deblocking filtering, 1 indicates weak deblocking filtering, and 0 indicates that no deblocking filtering is performed. Furthermore, the decoder may set the size of the deblocking filter based on the sizes of the unidirectional and bidirectional prediction areas.

In a specific embodiment, when the decoder generates a prediction block for the current block, the decoder may use both unidirectional prediction and bidirectional prediction only when reference picture L0 and reference picture L1 are the same. In another specific embodiment, when the decoder generates the prediction block for the current block, the decoder may use both unidirectional prediction and bidirectional prediction only when reference picture L0 and reference picture L1 are different from each other.

The residual signal distribution may differ between the unidirectional prediction area and the bidirectional prediction area. Specifically, the residual signal in the bidirectional prediction area may be less than that in the unidirectional prediction area. Therefore, the decoder may differently set a transform method applied to the unidirectional prediction area and a transform method applied to the bidirectional prediction area. In this case, a transform index may be signaled for each area. In another specific embodiment, the decoder may apply, to each of the unidirectional prediction area and the bidirectional prediction area, a transform method, for example, a transformation kernel, preset for each of the unidirectional prediction area and the bidirectional prediction area. The preset transformation method may be one among DCT2, DST7, DCT8, DCT5, DST1, DST4, and identity transform (IDT). In this case, the decoder may differently set the transform method applied to the unidirectional prediction area and the transform method applied to the bidirectional prediction area. In another specific embodiment, the decoder may set the transform method applied to the unidirectional prediction area to be the same as the transform method applied to the bidirectional prediction area. Specifically, the decoder may set DST7 as the conversion method for the unidirectional prediction area. Specifically, the decoder may set DCT2 as the conversion method for the bidirectional prediction area. The decoder may further perform a secondary transform after performing a primary transform on the current block. This is referred to as a low frequency non-separable transform (LFNST) in the present disclosure. In a specific embodiment, the decoder may not apply LFNST to a block to which unidirectional prediction and bidirectional prediction are applied. In another specific embodiment, when LFNST is applied, the decoder may use, as an LFNST area, an area different from an LFNST area used when a transform is performed on a block other than a block to which unidirectional prediction and bidirectional prediction are applied. In a specific embodiment, the decoder may apply LFNST in the unidirectional prediction area and apply only the primary transform in the bidirectional prediction area. This is because the unidirectional prediction area contains more residual signals. In another specific embodiment, the decoder may apply only the primary transform in the unidirectional prediction area and apply LFNST in the bidirectional prediction area.

The residual signal in the bidirectional prediction area may be less than the residual signal in the unidirectional prediction area. Therefore, such as in a sub-block transform (SBT) method, the encoder may not include the residual signal of the bidirectional prediction area in a bitstream, while including the residual signal of the unidirectional prediction area in the bitstream. The bitstream may include information indicating whether the residual signal is present in the unidirectional prediction area and the residual signal. The bitstream may further include information indicating the type of primary transform or the type of secondary transform. The decoder may determine, based on motion information of the current block, whether the current block used both unidirectional prediction and bidirectional prediction. When the current block used both unidirectional prediction and bidirectional prediction, the decoder may only parse the residual signal in the unidirectional prediction area without parsing the residual signal in the bidirectional prediction area. Furthermore, the decoder may recover the current residual signal by parsing the information about the type of the primary transform or secondary transform for the unidirectional prediction area. In this case, the information indicating the type of primary transform or the type of secondary transform may indicate one of preset transform types. The preset transform methods may be selected from one of DCT2, DST7, DCT8, DCT5, DST1, DST4, and identity transform (IDT).

The decoder may not be allowed to apply at least one of LIC, BCW, DMVR, TM, and OBMC in the bidirectional prediction area of a block to which both unidirectional prediction and bidirectional prediction are applied.

When the decoder generates a prediction block for the current block, the decoder may apply a method using both unidirectional prediction and bidirectional prediction equally to a luma block and a chroma block. Since the chroma block has a gradual change in video characteristics compared to the luma block, the decrease in prediction accuracy for the chroma block due to a padding area may be relatively small. Therefore, when the decoder generates a prediction block for the current block, the decoder may independently determine whether to apply the method using both unidirectional prediction and bidirectional prediction in each of the luma block and chroma block. For example, the decoder may apply, in the luma block, the method using both unidirectional prediction and bidirectional prediction, and may not apply, in the chroma block, the method using both unidirectional prediction and bidirectional prediction. In the chroma block, the decoder may use the padding area in the L0 prediction block of FIG. 23, in which case the decoder may generate the prediction block by using bidirectional prediction.

When the decoder generates a prediction block for the current block by using both unidirectional prediction and bidirectional prediction, the decoder may apply DMVR to a bidirectional prediction area of the current block. In this case, bidirectional motion information may be corrected due to the DMVR performed in the bidirectional prediction area. The available prediction block area may be adjusted due to the corrected motion information. For example, in FIG. 23, the L0 motion information in the bidirectional motion information corrected due to the DMVR performed in the bidirectional prediction area may be changed. The available prediction block area may further widen or narrow due to the corrected L0 motion information. In this case, the decoder may apply the corrected L0 motion information to both the bidirectional prediction area and the unidirectional prediction area, or only to the bidirectional prediction area. In this case, the decoder may determine an area to which the corrected L0 motion information is applied, based on at least one among the size of the current block, the size of the available prediction area, the corrected L0 motion information, and the L0 motion information before correction. In a specific embodiment, when the difference between the corrected L0 motion information and the L0 motion information before correction is less than (or greater than or equal to) a predetermined value, the decoder may correct the prediction block by using the newly corrected L0 motion information in both the bidirectional prediction area and the unidirectional prediction area.

The out-of-boundary (OOB) block in FIG. 23 will be described in detail. In a current block for which bidirectional prediction is performed, when a block predicted using the L0 motion information is outside the picture boundary (an area marked with X in FIG. 23), the decoder may generate an L0 prediction block by using only pixels inside the picture boundary, excluding the area outside the picture boundary. The decoder may generate a prediction block for the current block by weight-averaging the L0 prediction block and a block predicted using the L1 motion information. In this case, the decoder may use only pixels inside the current picture boundary to predict the L0 prediction block, and may use only the L1 prediction block to generate the area of the L0 prediction block corresponding to the portion of the current block that is outside the picture boundary. Even when the current block is a bidirectional prediction block, the decoder may generate a partial area of the prediction block as a unidirectional prediction block, and may generate an area other than the partial area as a bidirectional prediction block. In this case, blocking artifacts may occur at the boundary separating the unidirectional prediction block and the bidirectional prediction block. The decoder may perform filtering at the boundary, where the blocking has occurred, to alleviate the blocking. Here, the filtering may be an existing deblocking filter. Alternatively, the filtering may be the filtering used in a GPM block.

The existing deblocking filter operates only in a 4-pixel unit. Thus, when the boundary is not positioned at a boundary of a 4-pixel, no filtering is performed. Therefore, the decoder may make a change such that deblocking filtering is performed for all pixel positions with respect to the OOB blocks.

Figure 25:
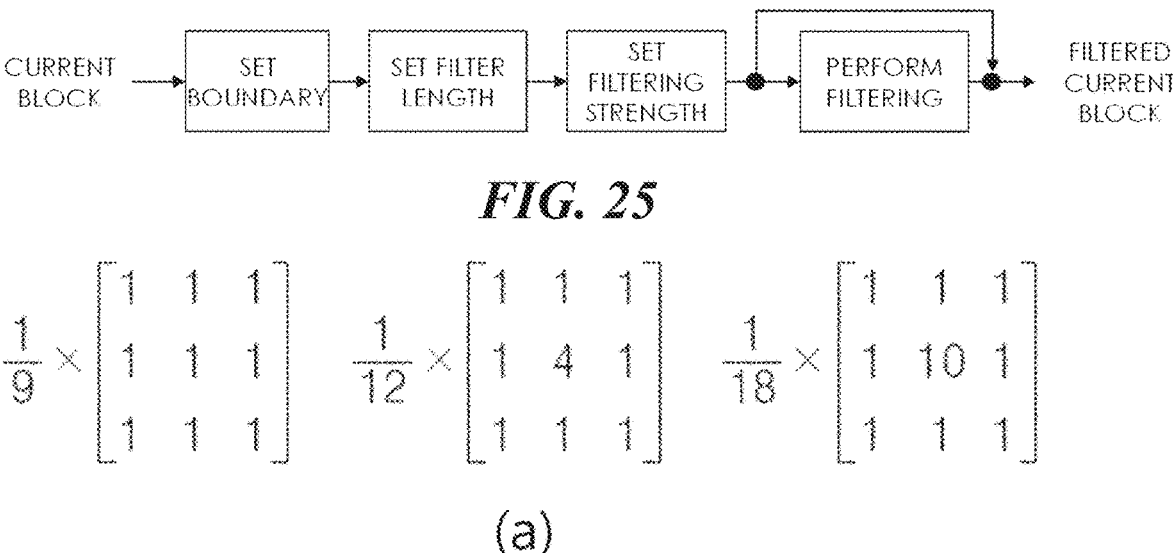
FIG. 25 illustrates a process in which a decoder according to an embodiment of the present disclosure performs deblocking filtering.

FIG. 25 illustrates a process in which a decoder according to an embodiment of the present disclosure performs deblocking filtering.

The decoder may set a boundary to which filtering is applied, based on a current reconstructed block. The decoder may determine whether a 4-pixel unit boundary is a boundary at which deblocking filtering is to be performed, based on whether the 4-pixel unit boundary is a transform block boundary or a prediction block boundary. When the current boundary is a transform block or prediction block boundary, the decoder may set the current block as the boundary at which deblocking filtering is to be performed. When the current boundary is neither a translation block boundary nor a prediction block boundary, the decoder sets the current boundary as a boundary at which deblocking filtering is not performed. When the current boundary is set as a boundary at which deblocking filtering is not performed, no deblocking filtering will be performed thereafter. For a boundary at which deblocking filtering is to be performed, the decoder may set the length of the filtering. The decoder may set the length of the filtering for each boundary, and may set the length of the filtering based on at least one among: whether the boundary is a transform block boundary or a prediction block boundary; the length (height or width) of both transform blocks relative to the boundary; the number of subblocks in the current block; the encoding mode of a prediction block; and the difference in distance between the boundary of the current block and the current boundary. The length of the filtering may be one of 1, 3, 5, and 7. The decoder may set the strength of the filtering based on at least one among the encoding mode of the current block, whether there is a non-zero transform coefficient of a transform block, and a difference in motion information between both prediction blocks relative to the boundary (e.g., whether reference pictures are different, or whether motion vectors differ by a ½ pixel or more). The strength of the filtering may be determined as one of 0, 1, and 2. The value of the filtering strength may have the meaning described above. The decoder may perform the filtering at each boundary based on the set length and strength of the filtering to generate a final filtered reconstructed block.

For an OOB block, the decoder may change the boundary setting process in FIG. 24 as follows. When a current block is an OOB block, the decoder may determine whether all 1-pixel unit boundaries, instead of 4-pixel unit boundaries, are boundaries at which deblocking filtering should be performed. When a boundary is an OOB boundary, the decoder may set the boundary as a boundary at which deblocking filtering should be performed. Next, the decoder may set the length of the filtering for the OOB boundary. In this case, the decoder may set the length of the filtering based on the lengths of both blocks relative to the boundary. For example, when either of the lengths of both blocks is less than 2, the decoder may set the length of the filtering to 1. Alternatively, the decoder may set the length of the filtering for the OOB boundary to a predetermined length. The predetermined length may be a positive integer. For example, the predetermined length may be 1. Next, the decoder may set the strength of the filtering. The decoder may set the strength of the filtering to a predetermined value. The predetermined value may be a positive integer. For example, the predetermined value may be 1. The decoder may use the length and strength of the filtering, which are set for the OOB boundary, to perform deblocking filtering, thereby generating a reconstructed block free of blocking artifacts.

When the decoder applies deblocking filtering to the OOB block, the boundary determination process is performed for all 1-pixel unit boundaries, thus increasing complexity. To reduce the complexity, the decoder may set an area in the OOB block, which is set by unidirectional prediction, in a 4-pixel unit. The unidirectional prediction area is set in a 4-pixel unit. Therefore, the OOB boundary is represented in the 4-pixel unit, and thus the decoder may maintain the boundary in the 4-pixel unit which is the unit of the existing deblocking filtering. When the decoder sets the unidirectional prediction area in the 4-pixel unit, the unidirectional prediction area may be set per a block of size 4×4. That is, when even one of pixels in a block of size 4×4 indicates being outside the picture boundary, the decoder may reset all pixels in the 4×4 block to indicate being outside the picture boundary. In this case, the decoder may set the 4×4 block as a unidirectional prediction block. The methods described above may be applied to a method for setting the length and strength of the subsequent deblocking filtering and performing the filtering.

At the OOB boundary, the decoder may differently apply the length and strength of deblocking filtering and whether to perform filtering, depending on whether the current block is a luma block or a chroma block. Alternatively, the decoder may perform the same deblocking filtering on a luma block and a chroma block. For example, when the current block is a luma block, the decoder may perform filtering by setting the length and strength of deblocking filtering at the GOB boundary to 2 and 1, respectively. When the current block is a chroma block, the decoder may perform filtering by setting the length and strength of deblocking filtering at the OOB boundary to 1 and 1, respectively. Alternatively, when the current block is a luma block, the decoder may perform deblocking filtering at the OOB boundary. In this case, when the current block is a chroma block, the decoder may not perform deblocking filtering at the OOB boundary.

Furthermore, since the OOB boundary occurs at the internal boundary of the current block (or a transformation block or a prediction block), the decoder may not apply the above-described methods to the boundary portion of the current block (or the transformation block or the prediction block). In other words, the decoder may apply the methods only to the internal boundary of the current block (or the transformation block or the prediction block). Therefore, the decoder may determine whether to apply the above methods by determining whether a boundary is a boundary or internal boundary of the current block (or the transformation block or the prediction block).

The blocking artifacts that occur at the boundary separating the unidirectional prediction block and the bidirectional prediction block may be removed using low-frequency filtering without using deblocking filtering.

Figure 26:
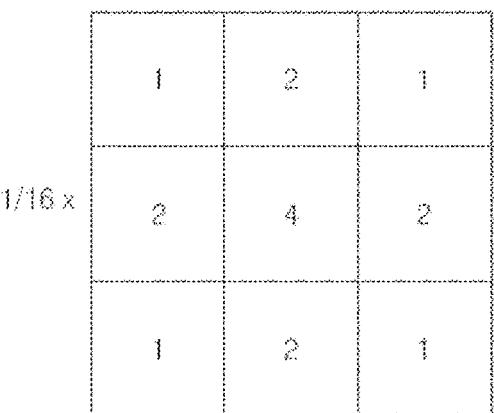
FIG. 26 illustrates a filter used for a boundary according to an embodiment of the present disclosure.

FIG. 26 illustrates a filter used for a boundary according to an embodiment of the present disclosure.

(a) of FIG. 26 shows three types of low-frequency filtering, and (b) of FIG. 26 shows a Gaussian filter. One of the low frequency filtering or Gaussian filtering may be performed on a predetermined number of neighboring pixels relative to a corresponding boundary to generate a prediction block from which blocking artifacts have been removed. The predetermined number may be an integer greater than or equal to 1. For example, the predetermined number may be 1.

Figure 27:
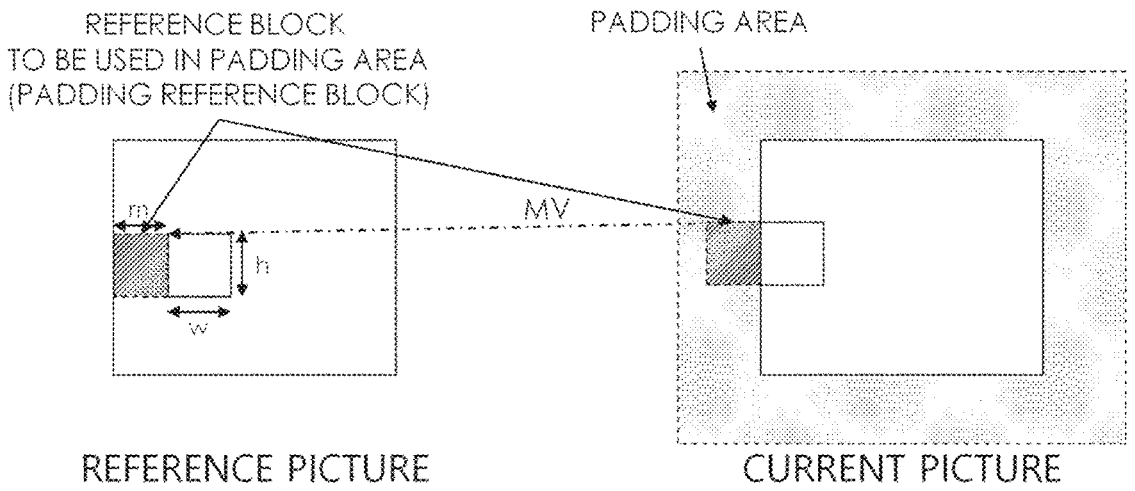
FIG. 27 illustrates a method for filling a padding area outside a current picture boundary from a reference picture according to an embodiment of the present disclosure.

FIG. 27 illustrates a method for filling a padding area outside a current picture boundary from a reference picture according to an embodiment of the present disclosure.

Typically, a current picture may be used as a reference picture after encoding or decoding is completed. When a moving object moves into or out of a picture, the motion vector may indicate the outside of a reference picture. Therefore, the reference picture may have a padding area with a predetermined size. In this case, the padding area is filled with samples at a picture boundary. That is, padding may be performed on an already reconstructed block boundary to generate a reference picture that is used to reconstruct the current picture.

To increase the encoding efficiency of a block referencing the padding area, a decoder may use, when constructing the padding area to use the reconstructed current picture as the reference picture as illustrated in FIG. 27, motion information (MV) of a current picture boundary block to construct the padding area of the current picture by using a block (a padding reference block or a shadowed block area in FIG. 27) adjacent to a reference block of a picture referenced by the current picture boundary block. The boundary block is a block, among blocks of the current picture, which includes the boundary of the current picture. The size of the used adjacent (the padding reference block or shadowed block area in FIG. 27) may vary depending on the size (w×h) of the picture boundary block and the distance (m) from the position of the reference block to the boundary of the reference picture. For example, in FIG. 27, the decoder may set the height of the adjacent block to be equal to the height of the reference block. Furthermore, the decoder may set the width of the adjacent block to the distance (m) from the position of the reference block to the boundary of the reference picture.

An embodiment in which padding is performed on the already reconstructed block boundary to generate a reference picture used for reconstructing the current picture is described with reference to FIGS. 28 and 29.

Figure 28:
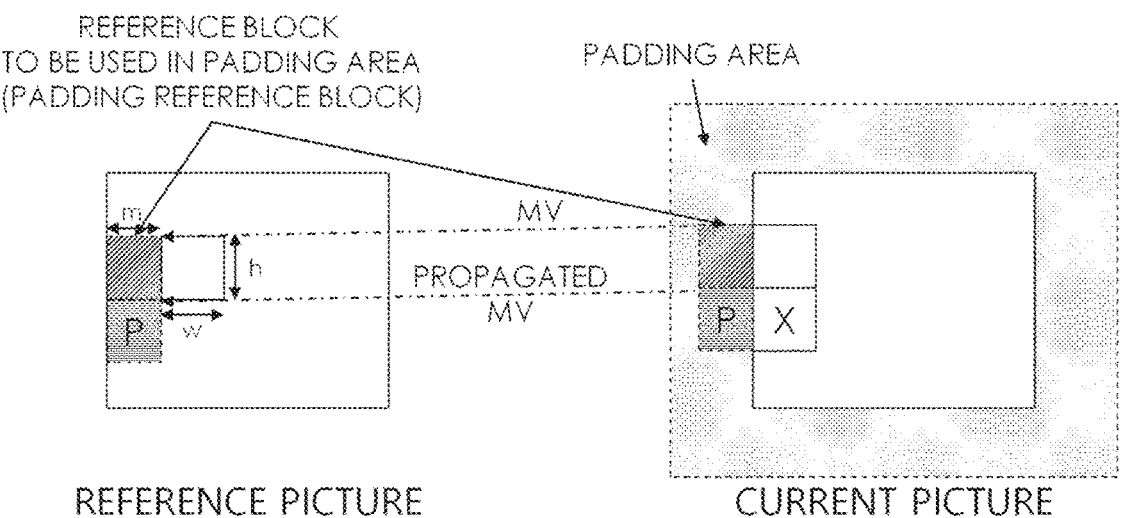
FIG. 28 illustrates a method by which a decoder according to an embodiment of the present disclosure generates a padding area when a boundary block is encoded in an intra mode.

FIG. 28 illustrates a method by which a decoder according to an embodiment of the present disclosure generates a padding area when a boundary block is encoded in an intra mode.

FIG. 28 shows that when a boundary block X in a current picture is not reconstructed using an inter mode, i.e., when the boundary block X is reconstructed using an intra mode, there may be no motion information. In this case, the decoder may use motion information of a neighboring block adjacent to the current boundary block X to fill a padding area adjacent to the boundary block X. In a specific embodiment, since the boundary block X is encoded in the intra mode, there is no motion information. Therefore, the decoder may derive an adjacent block P in a reference picture by using motion information of an above neighbor block, which is an adjacent neighboring block, based on the top left position of the boundary block X. The decoder may use the derived block to generate a padding area. Specifically, the decoder may generate a padding area adjacent to the boundary block by using a bottom adjacent block as a reference block referenced by the above neighboring block.

Figure 29:
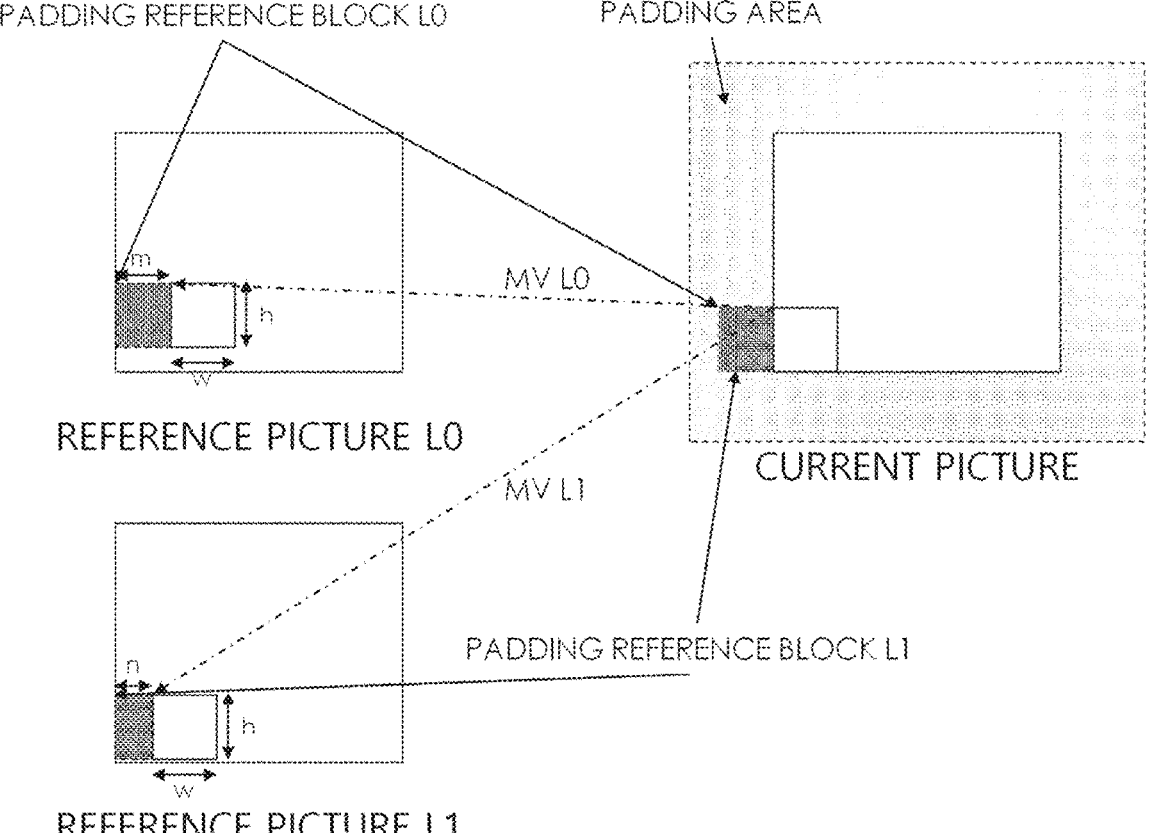
FIG. 29 illustrates a method by which a decoder according to an embodiment of the present disclosure generates a padding area when a boundary block performs bidirectional prediction.

FIG. 29 illustrates a method by which a decoder according to an embodiment of the present disclosure generates a padding area when a boundary block performs bidirectional prediction.

When a boundary block has been reconstructed using bidirectional prediction, the decoder may use motion information for bidirectional prediction to derive, from reference pictures, adjacent blocks to be used in a padding area. Specifically, when the boundary block is reconstructed using bidirectional prediction, the decoder may generate a block adjacent to the boundary block in the padding area by using one block adjacent to each of two reference blocks referenced by the boundary block. In this case, adjacent blocks derived using bidirectional motion information may have different sizes. Various embodiments may be applied as follows to a method for generating a padding area by using two adjacent blocks, such as the following.

The decoder may generate the padding area by weight-averaging the two adjacent blocks. When the two adjacent blocks have different sizes, the decoder may generate the padding area by weight-averaging only overlapping areas and by using a valid adjacent block for non-overlapping areas. In another specific embodiment, the decoder may generate a padding area by using the larger (or smaller) of the two adjacent blocks. For example, in FIG. 29, when m is greater than n, the decoder may generate the padding area by using an adjacent block of size m×h derived through L0 motion information. In another specific embodiment, the decoder may generate a padding area by using a block, which is larger than a predetermined size, among adjacent blocks derived using two pieces of motion information. For example, in FIG. 29, when m or n is greater than a predetermined size, the decoder may generate a padding area by using an adjacent block that is larger than a predetermined size. The predetermined size may be one of 0, 1, 2, and 3. In another specific embodiment, the decoder may generate the padding area according to a predetermined order or rule. For example, it may be specified that when bidirectional prediction is used for the current block, the decoder shall generate a padding area by using only the L0 motion information. In this case, the decoder may generate the padding area by using only the L0 motion information.

The decoder may determine whether to apply the above-described padding area generation method, based on at least one among slice type information of the current block (e.g., whether a slice is an I slice, a P slice, or a B slice), whether the current block is a tile, whether the current block is a sub-picture, the size of the current block, the depth of a coding unit, whether the current block is a luma block or a chroma block, whether the current block is a reference frame or a non-reference frame, and information about reference order and temporal layers according to layers of each picture. The method for determining whether to apply the above-described padding area generation method may be information that is prearranged between the decoder and the encoder.

Furthermore, the prearranged information may be determined based on the profile and level. Furthermore, the prearranged information may be represented by a variable value. A bitstream may include information about the variable value that indicates the prearranged information. That is, the decoder may parse the information about the variable value included in the bitstream to determine whether to apply the above-described padding area generation method. For example, the decoder may determine whether to apply the above-described padding area generation method, based on the horizontal or vertical length of the coding unit. For example, when the horizontal length or the vertical length is 32 or greater (e.g., 32, 64, 128, etc.), the decoder may apply the above-described padding area generation method. In another specific embodiment, when the horizontal length or the vertical length is less than 32 (e.g., 2, 4, 8, 16, etc.), the decoder may apply the above-described padding area generation method. Furthermore, when the horizontal length or the vertical length is 4 or 8, the decoder may apply the above-described padding area generation method.

Furthermore, the decoder may determine whether to generate a padding area by using an adjacent block of a reference block, based on the horizontal or vertical length of the current block, whether the current block is a luma block or a chroma block, motion information of the current block, the motion resolution of the current block, the encoding mode of the current block, and whether PROF or DMVR is applied to the current block. For example, when PROF or DMVR is applied to the current block, motion information is not changed, and only prediction samples of the current block are changed, whereby blocking artifacts may occur between the current block and an adjacent block derived through the motion information of the current block. Therefore, when PROF or DMVR is applied to the current block, the decoder may not generate a padding area by using an adjacent block of the reference block. In this case, the decoder may use the existing picture boundary samples to generate the padding area.

The above methods described in the present specification may be performed by a processor in a decoder or an encoder. Furthermore, the encoder may generate a bitstream that is decoded by a video signal processing method. Furthermore, the bitstream generated by the encoder may be stored in a computer-readable non-transitory storage medium (recording medium).

The present specification has been described primarily from the perspective of a decoder, but may function equally in an encoder. The term "parsing" in the present specification has been described in terms of the process of obtaining information from a bitstream, but in terms of the encoder, may be interpreted as configuring the information in a bitstream. Thus, the term "parsing" is not limited to operations of the decoder, but may also be interpreted as the act of configuring a bitstream in the encoder. Furthermore, the bitstream may be configured to be stored in a computer-readable recording medium.

The above-described embodiments of the present invention may be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A video signal decoding apparatus comprising a processor,
wherein the processor is configured to:
when a current block is a boundary block adjacent to a picture boundary of a current picture comprising the current block, acquire a padding reference block from a first reference picture for the current picture based on the first reference picture and motion information of the boundary block, generate a padding area adjacent to the boundary block based on the padding reference block, and generate a second reference picture for a next picture using the padding area.

2. The decoding apparatus of claim 1, wherein the processor is configured to:
when generating a prediction block of the current block using a unidirectional prediction area predicted by using a unidirectional prediction and a bidirectional prediction area predicted by using a bidirectional prediction, determine a boundary between the unidirectional prediction area and the bidirectional prediction area in the prediction block of the current block, and apply a filter to the determined boundary.

3. The decoding apparatus of claim 2, wherein the processor is configured to
when generating the prediction block of the current block using the unidirectional prediction area and the bidirectional prediction area, determine the boundary between the unidirectional prediction area and the bidirectional prediction area by using at least one among motion information of the current block, whether a prediction sample of the prediction block of the current block is outside the picture boundary, an area of the prediction block, and whether the current block is in a mode in which both the unidirectional prediction and the bidirectional prediction are used.

4. The decoding apparatus of claim 3, wherein the filter is a low frequency filter or a deblocking filter.

5. The decoding apparatus of claim 1, wherein the processor is configured to:
acquire the padding reference block by using motion information of a block adjacent to the boundary block in case that the boundary block is not reconstructed using an inter mode.

6. The decoding apparatus of claim 5, wherein in case that the boundary block is not reconstructed using the inter mode, the padding area adjacent to the boundary block is generated using a bottom adjacent block as a reference block referenced by an above neighboring block, which is an adjacent neighboring block with respect to a top left position of the boundary block.

7. A video signal encoding apparatus comprising a processor,
wherein the processor is configured to acquire a bitstream that is decoded by a decoding method, and
wherein the decoding method comprises:
when a current block is a boundary block adjacent to a picture boundary of a current picture comprising the current block, acquiring a padding reference block from a first reference picture for the current picture based on the first reference picture and motion information of the boundary block, generating a padding area adjacent to the boundary block based on the padding reference block, and generating a second reference picture for a next picture using the padding area.

8. The encoding apparatus of claim 7, wherein the decoding method further comprises: when generating a prediction block of the current block using a unidirectional prediction area predicted by using a unidirectional prediction and a bidirectional prediction area predicted by using a bidirectional prediction, determining a boundary between the unidirectional prediction area and the bidirectional prediction area in the prediction block of the current block, and applying a filter to the determined boundary.

9. The encoding apparatus of claim 8, wherein the determining the boundary between the unidirectional prediction area and the bidirectional prediction area comprises determining the boundary between the unidirectional prediction area and the bidirectional prediction area by using at least one among motion information of the current block, whether a prediction sample of the prediction block of the current block is outside the picture boundary, an area of the prediction block, and whether the current block is in a mode in which both the unidirectional prediction and the bidirectional prediction are used.

10. The encoding apparatus of claim 9, wherein the filter is a low frequency filter or a deblocking filter.

11. The encoding apparatus of claim 7, wherein the decoding method further comprises:

acquiring the padding reference block by using motion information of a block adjacent to the boundary block in case that the boundary block is not reconstructed using an inter mode.

12. The encoding apparatus of claim 11, wherein in case that the boundary block is not reconstructed using the inter mode, the padding area adjacent to the boundary block is generated using a bottom adjacent block as a reference block referenced by an above neighboring block, which is an adjacent neighboring block with respect to a top left position of the boundary block.

13. A computer-readable non-transitory storage medium for storing a bitstream, wherein the bitstream is decoded by a decoding method, and wherein the decoding method comprises:

when a current block is a boundary block adjacent to a picture boundary of a current picture comprising the current block, acquiring a padding reference block from a first reference picture for the current picture based on the first reference picture and motion information of the boundary block, generating a padding area adjacent to the boundary block based on the padding reference block, and generating a second reference picture for a next picture using the padding area.

* * * * *